US012601026B2

(12) United States Patent
Gao

(10) Patent No.: US 12,601,026 B2
(45) Date of Patent: Apr. 14, 2026

(54) METHOD FOR PREPARING STAINLESS STEEL SEAMLESS TUBE WITH ULTRA-HIGH CLEANLINESS FOR INTEGRATED CIRCUIT AND IC INDUSTRY PREPARATION DEVICE, AND STAINLESS STEEL SEAMLESS TUBE

(71) Applicant: Shengtak New Materials Co., Ltd, Changzhou (CN)

(72) Inventor: Hong Gao, Changzhou (CN)

(73) Assignee: Shengtak New Materials Co., Ltd, Changzhou (CN)

( * ) Notice: Subject to any disclaimer, the term of this patent is extended or adjusted under 35 U.S.C. 154(b) by 577 days.

(21) Appl. No.: 18/102,720

(22) Filed: Jan. 29, 2023

(65) Prior Publication Data

US 2023/0304118 A1     Sep. 28, 2023

(30) Foreign Application Priority Data

Mar. 28, 2022    (CN) .......................... 202210309492.7

(51) Int. Cl.
| | |
|---|---|
| *C21D 9/08* | (2006.01) |
| *B21B 19/04* | (2006.01) |
| *C21C 5/00* | (2006.01) |
| *C21C 5/52* | (2006.01) |
| *C21C 7/064* | (2006.01) |
| *C21C 7/068* | (2006.01) |
| *C21C 7/10* | (2006.01) |
| *C21D 6/00* | (2006.01) |
| *C21D 8/10* | (2006.01) |
| *C22C 33/06* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/48* | (2006.01) |
| *C22C 38/50* | (2006.01) |
| *C22C 38/60* | (2006.01) |
| *F16L 9/02* | (2006.01) |

(52) U.S. Cl.
CPC ................ *C21D 9/08* (2013.01); *B21B 19/04* (2013.01); *C21C 5/005* (2013.01); *C21C 5/5241* (2013.01); *C21C 7/064* (2013.01); *C21C 7/0685* (2013.01); *C21C 7/10* (2013.01); *C21D 6/004* (2013.01); *C21D 6/005* (2013.01); *C21D 6/008* (2013.01); *C21D 8/10* (2013.01); *C22C 33/06* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/42* (2013.01); *C22C 38/44* (2013.01); *C22C 38/48* (2013.01); *C22C 38/50* (2013.01); *C22C 38/60* (2013.01); *F16L 9/02* (2013.01)

(58) Field of Classification Search
None
See application file for complete search history.

(56) References Cited

FOREIGN PATENT DOCUMENTS

CN          112795847 A  *  5/2021  ............. C22C 33/04

* cited by examiner

*Primary Examiner* — Jenny R Wu

(57) ABSTRACT

The invention discloses a method for preparing a stainless steel seamless tube with ultra-high cleanliness for an integrated circuit and an IC industry preparation device, and a stainless steel seamless tube with ultra-high cleanliness. The stainless steel seamless tube which comprises, by mass, C≤0.010%, P≤0.020%, S≤0.010%, Mn≤0.10%, Si≤0.30%, Se≤0.010%, Al≤0.010%, Cu≤0.20%, Cr16.50-17.00%, Ni14.50-15.00%, Mo2.20-2.50%, N≤0.010%, Ni≤0.010%, Ti≤0.010% and the balance Fe and impurities is prepared through a: a stainless steel refining process; b: a vacuum induction melting and vacuum consumable remelting process; c: a stainless steel forging process; d: a hot piercing process; e: a cold working process; f: an inner bore electrolytic polishing, pickling and passivation process; and g: a cleaning process. The stainless steel seamless tube with ultra-high cleanliness prepared through these processes meet the requirements for ultra-high cleanliness and high performance of 316L stainless steel tubes for a semiconductor preparation device.

9 Claims, No Drawings

1

METHOD FOR PREPARING STAINLESS STEEL SEAMLESS TUBE WITH ULTRA-HIGH CLEANLINESS FOR INTEGRATED CIRCUIT AND IC INDUSTRY PREPARATION DEVICE, AND STAINLESS STEEL SEAMLESS TUBE

CROSS-REFERENCE TO RELATED APPLICATION

The present application claims priority from Chinese Patent Application No. 202210309492.7 filed on Mar. 28, 2022, the contents of which are incorporated herein by reference in their entirety.

BACKGROUND OF THE INVENTION

1. Technical Field

The invention relates to the field of metal smelting and rolling, in particular to a method for preparing a stainless steel seamless tube with ultra-high cleanliness for an integrated circuit and an IC industry preparation device, and a stainless steel seamless tube with ultra-high cleanliness.

2. Description of Related Art

In recent years, the great demand for semiconductors in the fields of communication, computers, industrial control, consumer electronics and automotive electronics in China leads to a rapid development of emerging applications such as AI, quantum computation, 5G, Internet of Things and smart cities, which in turn accelerates the development of the scale and advanced manufacturing processes of the IC industry, and 14 nm, 7 nm and even more advanced manufacturing processes are promoted in China to realize mass production, but there is still a gap of generations relative to the world-class advanced level. At present, high-performance and high-end IC chips completely depend on import, which is results in a prominent problem of heteronomy, and particularly, the emergence of the international tide of reverse globalization in recent years leads to an interruption of the supply of high-end IC chips to China, increasing the risk of instability of the IC industry chain. Under the drive of national and local industrial investment funds, the development of the semiconductor industry chain is promoted. However, the key technology for manufacturing stainless steel tubes with ultra-high cleanliness used in the fields of semiconductor devices, compound semiconductors, laser devices, LCD devices, light-guide fibers, solar cells and biological medicine is mastered by countries such as Europe, America, Japan and South Korea, which endangers the security of the IC industry and relevant industry systems in China.

With the constant upgrade of the advanced manufacturing processes of ultra-large-scale IC chips, the line width of the chips is becoming increasingly smaller, and the requirements for the purity of special gases, granularity, impurity content and dew point are becoming increasingly higher. The manufacturing processes of dry etching, oxidization, ion implantation and thin film deposition of IC chips, semiconductor devices, laser devices, LCD devices, light-guide fibers, and solar cells use a large quantity of ultra-clean and high-purity special gases, the cleanness of which has a decisive influence on the performance and yield of products. To ensure the ultra-high cleanliness of transported special gases, the inner surface of stainless steel tubes should be extremely smooth and should have high corrosion resistance and wear resistance. Thus, 316L stainless tubes with ultra-high cleanliness are used to transport process gases used for semiconductor devices, compound semiconductors, LCD devices, laser devices, light-guide fibers and solar cells, as well as gases and liquids in the fields of biological medicine and food security. The content of C in stainless steel tubes should be ultra-low to reduce the formation of carbides in steel, and N has to be added to improve mechanical property requirements. Meanwhile, metal components Cr and Ni should reach relevant standards, and the content of hazardous elements such as P, S, Mn, Si, Al and Cu, and the content of O and H in materials should be as low as possible, and a high-purity, fine-grain and fully-austenitic metallographic structure is obtained through hot metal pretreatment including S removal, Si removal and P removal+low-purity alloy addition for K-OBM-S strong deoxidation, vacuum oxygen decarburization (VOD), vacuum induction melting (VIM), vacuum arc remelting (VAR) V/V, casting/hot rolling, hot piercing and cold working. The inner wall of steel tubes is electrolytically polished to make the roughness of the inner surface of the steel tubes reach Ra≤0.2 μm or even lower, thus improving the surface smoothness, chromium-rich layer and corrosion resistance of the inner wall of the tubes; then, free iron ions on the surface of the tubes are removed through a purification process to meet UHP requirements of the SEMI standard in the semiconductor industry: Cr/Fe>1.5, and CrOX/FeOX>2. Next, the cleanliness of the steel tubes is remarkably improved through cleaning with ultra-high cleanliness and inner bore flushing with nitrogen. The main specifications of stainless steel seamless tubes with ultra-high cleanliness are ¢9.53 mm*0.89 mm-¢76.2 mm*2.54 mm, and the length of the stainless steel seamless tubes is generally 6 m.

BRIEF SUMMARY OF THE INVENTION

The technical issue mainly to be settled by the invention is to provide a method for preparing a stainless steel seamless tube with ultra-high cleanliness for an integrated circuit and an IC industry preparation device, and a stainless steel seamless tube, which can control the content of O and H that have an influence on endurance strength and fatigue strength, reduce pollution to transported gas, and minimize the content of hazardous elements through VOD refining and VAR and vacuum pressure furnace refining, thus meeting the comprehensive performance requirements for surface quality and mechanical properties.

One technical solution adopted by the invention to settle the above technical issue is as follows: a method for preparing a stainless steel seamless tube with ultra-high cleanliness for an integrated circuit and an IC industry preparation device is provided, comprising the following steps: a: a stainless steel refining process: with 316L stainless steel as a base material, adding alloys into an EAF for primary smelting and hot metal pretreatment including S removal, Si removal and P removal to reduce the content of S, Si, P and C in hot metal to prepare stainless steel pre-melt; performing oxygen pre-blowing and boiling decarburization on the stainless steel pre-melt in a K-OBM-converter to make the content of C in a slag system less than or equal to 0.9%; next, performing VOD refining to make the content of Al less than or equal to 0.03% and the content of oxygen less than or equal to 0.0030%; then, performing LF refining to control the content of Al in the steel to 0.012%-0.018%, the content of oxygen in the steel to 0.0011%-0.0020% and the content of H in the steel to 0.0005%-0.0010%, to make non-metallic inclusions in molten steel refined and distributed dispersively; b: a vacuum induction melting and vacuum consumable remelting process: removing C, O, H and low-melting point impurities in the molten steel through vacuum induction melting to reduce the solubility of O and H in the molten steel, removing compounds formed by Mo, Ca, C, Al, P, S, Si, As and low-melting point elements in the molten steel by floating with slag, and then performing casting to obtain a steel ingot; using the steel ingot as an electrode for vacuum consumable remelting, further purifying the molten steel in the process of melting the electrode to form liquid drops/washing and solidifying the slag, to make the content of ferrite less than or equal to 0.5%, the content of H less than or equal to 0.0002% and the content of O less than or equal to 0.0015%; c: a stainless steel forging process: preparing round billets through steel ingot forging and continuous steel bar rolling; d: a hot piercing process: performing hot piercing on the round billets to produce qualified pierced billets; e: a cold working process: performing intermediate cold working and finish-rolling cold working to obtain stainless steel seamless tubes; f: an inner bore electrolytic polishing, pickling and passivation process: hanging the stainless steel seamless tubes prepared in Step e on a customized fixture, using a stainless steel tube in an electrolytic cell as an electrolytic anode, performing heating through an electrical heating rod, controlling the temperature of acid liquor to 43° C.-70° C., a DC multi-pulse voltage to be lower than or equal to 30V and a current density to 5-50 A/dm, and stirring a polishing solution for convection to decrease a temperature difference of an electrolyte to prevent the anode from being overheated, wherein the electrolytic polishing time is 5-15 min; after polishing is finished, performing pickling and passivation to make Cr/Fe>1.5 and CrOX/FeOX>2, and removing free ion ions on a surface of each stainless steel seamless tube to form a chromium-rich layer on the surface to improve corrosion resistance; and g: a cleaning process: degreasing and cleaning the stainless steel seamless tube prepared in Step f, wherein vibration cleaning is performed on the stainless steel seamless tubes first with ultrasonic waves and a cleaning agent, inner bores of the stainless steel seamless tubes are washed one by one by means of a high-pressure circulating water spray lance after the stainless steel seamless tubes are cleaned, outer surfaces of the stainless steel seamless tubes are sprayed to be rinsed, the temperature of cleaning water is controlled to 60° C.±5° C., water on the surfaces of the stainless steel seamless tubes drains off, and inner walls of the tubes are purged one by one to remove water; then, the stainless steel seamless tubes are cleaned by means of an ultrasonic cleaning machine using pure water as cleaning water, the inner bores of the tubes are washed with high-pressure water for 1-5 min, the outer surfaces of the tubes are rinsed for 3-5 min, then water on the outer surfaces drains off, the interior of each tube is purged with compressed air to remove water, and finally, stainless steel seamless tubes with ultra-high cleanliness are obtained.

In a preferred embodiment of the invention, the electrolytic polishing solution in Step f is prepared from $H_2SO_4$ with a concentration of 98%, $H_3PO_4$ with a concentration of 85%, and ionized water, and comprises 15%-20% (mass fraction) of $H_2SO_4$, 63%-67% of $H_3PO_4$, 12%-22% of $H_2O$, and an additive, and the proportion of the electrolytic polishing solution is adjusted to 1.5-1.7; and a passivation solution is a $HNO_3$ solution with a mass percent of 20%-35%, and the 316 stainless steel tubes are passivated in a passivation cell for 10-30 min.

In a preferred embodiment of the invention, through hot metal pretreatment including S removal, Si removal and P removal in Step a, impurity element are removed during smelting, such that lime slag-making materials for removing Si and P during steelmaking are reduced, the quantity of slag is reduced, the content of S is decreased to 0.05%-0.06%, the content of Si is decreased to 0.3%-1.0%, the content of P is decreased to 0.14%-0.3%, and the content of C in the molten steel is 4%-6%.

In a preferred embodiment of the invention, in Step a, the K-OBM-S converter adopts strong stirring based on top oxygen blowing and bottom oxygen and nitrogen or argon blowing for decarburization to increase the decarburization rate and reduce the loss of Cr; by controlling bottom-blowing strong stirring for oxygen pre-blowing and boiling decarburization, the inclusions are controlled within a low melting point range and are promoted to float rapidly to be removed; and Ni alloy is added, so the temperature is maintained at 1680-1750° C., and the decarburization rate is 0.15-0.3% min; and the content of C in the steel is controlled to reduce the decarburization pressure during VOD smelting, so the hazardous elements P and S are removed, and the cleanliness of the molten steel is improved.

In a preferred embodiment of the invention, in Step a, a VOD furnace adopts argon-blowing strong stirring, Al shots are used as a strong deoxidant; after Al deoxidation, CaO and MgO are added, the alkalinity is controlled, and bottom-blowing strong stirring is performed to make an deoxidized product exist in the molten steel in the form of an $Al_2O_3$ inclusion, such that the quantity of the $Al_2O_3$ inclusion in the molten steel is greatly increased; high-aluminum refining slag which comprises 40%-60% of CaO, 10%-20% of $SiO_2$, 6%-12% of MgO and 15%-25% of $Al_2O_3$ and has an alkalinity of r2-3.5 is added; large inclusions are absorbed by the slag and float with the slag to be removed, such that the inclusions in the steel are changed from composite inclusions into pure magnesium aluminate spinel inclusions; and the content of P, S, Si and Al in the stainless steel is further decreased, and the content of O and H is further decreased through VOD refining.

In a preferred embodiment of the invention, during LF steel ladle refining in Step a, a slag system with a high content of MgO $Al_2O_3$ is formed to further remove O and H in the steel; then, weak argon stirring is performed to remove 10 μm or even smaller inclusions through bubbles, and the small inclusions collide one another and are gathered to form large-grained inclusions more rapidly, so the inclusions float rapidly to be removed; and through strong deoxidation with Al powder, slag system optimization, calcium treatment and weak stirring, the content of Al in the steel is controlled to 0.012%-0.018%, thus ensuring that the content of oxygen is less than or equal to 0.0015% and the content of H is 0.0002%-0.0005%.

In a preferred embodiment of the invention, during vacuum induction melting in Step b, the temperature of the molten steel is controlled to 1620° C.-1670° C., and melting is performed for 15-21 min under a vacuum condition of 4-10 pa, argon-blowing strong stirring is performed to effectively reduce C—O partial pressure and reduce a product of carbon content and oxygen content, making components of the molten steel uniform; C, O, H and low-melting point impurities in the molten steel are removed from a surface of the molten steel, and then, metallic components of the molten steel are adjusted to ensure that impurities in the 316L stainless steel are minimized and the components of the molten steel are uniform; the molten steel is condensed in the furnace; when power is cut off to cool the molten stainless steel to 1450° C.-1490° C., the molten steel is condensed to reduce the solubility of O and H in the molten steel, such that dissolved gas appears on the surface of the molten steel and is released from the molten steel; power supply resumes for vacuum induction melting, the temperature is increased to be slightly higher than the melting point 1545±10° C. of the stainless steel, and $SiO_2$ and desulfurizing agents CaO and MgO are added to the steel under the condition of argon-blowing stirring to form a low-melting point and high-alkalinity slag system, which comprises, by mass, 45% of CaO, 18% of $SiO_2$, 6% of MgO and 30% of $Al_2O_3$ and has an alkalinity of r2-3.0; when $SiO_2$, CaO and MgO are added, stirring is performed to enable the inclusions to be further adsorbed by the slag to be removed, such that 0, S and H gathered on the surface of the molten steel are effectively removed finally; vacuumizing is performed at this temperature for 5±1 min until the vacuum degree is less than 5 pa, and different compounds formed by Mo, Ca, C, Al, P, S, Si, As and other low-melting point elements in the molten steel are adsorbed by the slag and float with the slag to be removed.

In a preferred embodiment of the invention, during vacuum consumable remelting in Step b, low-alkalinity refining slag which comprises 17% of CaO, 22% of SiO, 3% of MgO and 15% of $Al_2O_3$ and has an alkalinity of r1.0-1.5 is used, Al powder added during slagging consumes oxides in liquid slag, and inclusions are removed through slag washing and floating in a molten bath; when the remaining weight of the consumable electrode is 20%, final hot-topping is performed, the current is gradually reduced to 1.4-1.8 kA, an electric arc is maintained and smelting feeding is performed continuously, the voltage is controlled to 22.0-25.0V, a melting rate of the consumable electrode is controlled to 1.0-1.5 kg/min, water inlet and outlet temperatures of a crucible are controlled to 30-32° C., and argon is introduced for protection in the whole smelting process to the end of smelting; chemical components in the steel are checked, and when 0, H and hazardous impurity elements are out of limits, vacuum consumable remelting needs to be performed again; and the cast ingot is discharged after being continuously cooled to be less than or equal to 400° C. in a vacuum condition.

In a preferred embodiment of the invention, technical parameters of the hot piercing process based on temperature-rotational speed matching of the stainless steel pierced billet in Step d meet the following conditions: when a diameter of the pierced billet is less than or equal to 65 mm, an outlet temperature of a heating furnace is controlled to 1160° C.-1200° C., a heating time is controlled to 140 min-160 min, a holding time is controlled to 15 min-28 min, and a deformation rate of a corresponding 60 piercing machine is controlled to 89-92 r/min; when the diameter of the billet is 75 mm-135 mm, the outlet temperature of the heating furnace is controlled to 1170° C.-1220° C., the heating time is controlled to 170 min-290 min, the holding time is controlled to 23 min-64 min, and a deformation rate of a corresponding 90 piercing machine is controlled to 74-77 r/min; through immersive rapid cooling of the billet after piercing, a ferritic phase in a solid state is re-dissolved at high temperature into a solid solution at normal temperature, and the content of ferrite in a thickness direction of a tube wall is further decreased gradiently, such that the content of remaining ferrite in the billet is less than or equal to 0.5%.

In a preferred embodiment of the invention, when a two-roller tube cold-rolling mill is used for rolling in Step e, grains are drawn to be fibrous in a deformation direction according to a coefficient of elongation of rolling deformation, which is 1.5-2.3, corresponding to a grain size of the pierced billet, the dislocation density is gradually improved, the degree of distortion in the structure is improved, the degree of compression or elongation of the grains is increased, and a nuclear driving force and a growth driving force of the grains is remarkably increased; the tube is fully cold-rolled and deformed to avoid non-uniformity of the grains of the tube, a coefficient of elongation of deformation of the cold-rolled tube is 1.5-2.3, a diameter reduction is controlled to 32%-50%, a wall reduction is controlled to 30%-55%, and cold expanding/drawing and cold rolling are combined to fulfill a large deformation of the cold-rolled tube and flexible production of cold expanding/drawing; the large deformation is realized through deformation accumulation, the size and morphology of austenite grains are controlled, the coefficient of elongation in each pass is controlled to 1.05-1.7, the diameter reduction is controlled to 10%-40%, and the wall reduction is controlled to 10%-48%; a roller-hearth solution heat treatment furnace is used, a solution heat treatment temperature is controlled to 1100° C.±10° C., and a holding time of the tube is controlled to 1.5-2.5*wall thickness min; a large deformation for grain refining is realized through the accumulation of deformation of multi-passes drawing/rolling of the tube, to make the grains of the tube more uniform; deformation accumulation is realized through primary cold rolling or cold expanding/drawing by the two-roller precise tube cold-rolling mill, other comprehensive performance requirements should be met during finish rolling of the tube, the coefficient of elongation of finish-rolling deformation of the cold-rolled tube is finely adjusted to 1.2-1.6, the diameter reduction is controlled to 12%-31%, the wall reduction is controlled to 12%-32%, a tube diameter tolerance is controlled to ±0.05 mm, and the grain size is controlled to level 5-7, such that corresponding outer diameter, wall thickness and tolerance requirements are met; solution heat treatment for finish rolling: the temperature is controlled to 1080° C.±5° C., cold-working stress is released under the condition of guaranteeing the length and sectional temperature consistency of the tube, a total-hydrogen radiant tube heating roller-hearth bright solution heat treatment furnace is used, and the tube is quickly cooled after being heated, such that the grains are effectively controlled, work hardening is eliminated, and the structure and performance of the tube are restored; and the solution temperature is controlled to 1080° C.±10° C., and the holding time of the finished tube is controlled to (1.0-1.5)*wall thickness min, such that all remaining ferrite is quickly dissolved to the austenitic stainless steel tube.

Another technical solution adopted by the invention to settle the above technical issue is as follows: a stainless steel seamless tube with ultra-high cleanliness for an integrated circuit and an IC industry preparation device is provided. The stainless steel seamless tube with ultra-high cleanliness is prepared through the method for preparing a stainless steel seamless tube with ultra-high cleanliness for an integrated circuit and an IC industry preparation device, and comprises, by mass, C≤0.010%, P≤0.020%, S≤0.010%, Mn≤0.10%, Si≤0.30%, Se≤0.010%, Al≤0.010%, Cu≤0.20%, Cr16.50-17.00%, Ni14.50-15.00%, Mo2.20-2.50%, N≤0.010%, Ni≤0.010%, Ti≤0.010% and the balance Fe and impurities, and the content of components of a chromium equivalent and a nickel equivalent is controlled to control Creq/Nieq to 1.10-1.30.

The invention has the following beneficial effects: according to the method for preparing a stainless steel seamless tube with ultra-high cleanliness for an integrated circuit preparation device and an electronic chemical preparation device, and the stainless steel seamless tube provided by the invention, an intracrystalline twin change and restoration of dislocation occur mainly, and original coarse grains can be more easily changed into fine grains, which can improve mechanical properties and can also improve CSL grain boundaries in unit area. Upon a lot of experiments and studies, coarse grains are generated during casting in the hot working process, dendrites are removed through hammer cogging, repeated forging and hot rolling are performed to obtain a steel bar, and the compression ratio of forging is controlled to 3-5. A billet is prepared through hot piercing; after cogging, rapid cooling is performed to prevent carbides from being precipitated on the grain boundary; through multi-pass expanding/drawing, rolling deformation accumulation and solution heat treatment, the grain size and morphology of the cold-worked tube are further controlled to enable the carbides to be fully melted in an austenitic stainless steel solid solution, such that the grains are refined.

The processing stress is eliminated through deformation accumulation of multi-pass cold rolling or cold drawing and sufficient solution heat treatment, such that the grain size is smaller; and on this basis, fine grains are formed through final cold-rolling of the tube, and a morphologic structure with more closely-packed planes parallel to the outer surface is formed after the finished tube is subjected to heat treatment, such that the intercrystalline corrosion resistance is improved Through accurate control (the control accuracy reaches ±0.002%) and matching of C, Ni and Ti during melting, the trend of intercrystalline corrosion of steel is avoided. The addition of Ti will lead to the formation of inclusions, so the content of Ti should be strictly controlled. The content of Ni and Mo used as strong carbide formers can be increased to improve hot strength and corrosion resistance, reduce the solubility of C in steel in $\gamma$, and accelerate the formation of an $M_{23}C_6$ phase; by properly increasing the content of N, which has a high binding capacity during high-temperature long acting and can be dissolved in the $\gamma$ matrix to decrease the diffusion rate of Cr and C to restrain $M_{23}C_6$ coarsening, within limit, a solution strengthening effect can be realized, thus remarkably improving the fatigue resistance and fracture toughness of steel and improving the capacity to resist intercrystalline corrosion of the 316L stainless steel seamless tube in the 650° C.*2 h sensitized state.

Carbides are fully dissolved in austenitic stainless steel by controlling the intermediate deformation cold-rolling and solution heat treatment process under the condition that the nickel equivalent is within limit, thus meeting the basic requirements of intercrystalline corrosion sensitization tests.

DETAILED DESCRIPTION OF THE INVENTION

The technical solutions of the embodiments of the invention will be clearly and completely described below. The structures, scales and sizes in the drawings of this specification are merely used to assist in explaining the contents disclosed by this specification to allow those skilled in the art to understand and read these contents, and are not intended to limit the implementations of the invention, so they have no technical substantive meaning. Any modifications of the structures, changes of the scales or adjustments of the sizes made without affecting the effects and purposes to be realized by the invention still fall within the scope of the technical contents disclosed by the invention. Moreover, terms such as "upper", "lower", "left", "right" and "middle" cited in this specification are merely for the convenience of description rather than being used to limit the implementations of the invention, and changes or adjustments of corresponding relations made without substantially changing the technical contents should be regarded as falling the implementation scope of the invention.

When a stainless steel seamless tube with ultra-high cleanliness for an integrated circuit and an IC industry preparation device is smelted, each ton of steel can absorb about 200 g of gas, so various pollutants are adhered to the surface of the tube, and a certain amount of gas is retained in metal lattices of the tube. When gas is injected into the tube, gas retained on the surface of the inner wall of the tube will enter transported gas, thus polluting the ultra-pure industrial gas. When the airflow in the tube does not flow, the gas in the tube is adsorbed again under pressure; when the airflow is stopped, the gas adsorbed by the tube is dissolved due to pressure reduction, and the dissolved gas enters the pure industrial gas in the tube as impurities. Meanwhile, metal on the inner surface of the tube will generate a certain quantity of tiny particles due to repeated adsorption and dissolution, and such tiny stainless steel particles will pollute the pure gas in the tube, thus compromising the yield of semiconductor preparation. Moreover, some corrosive gases may corrode the inner surface of high-purity gas transport pipelines. Thus, 316L stainless steel tubes with ultra-high purity are often used to transport ultra-pure gases for semiconductor preparation devices.

Stainless steel materials of the ultra-pure stainless steel seamless tube should have high purity. On the basis of using 316L stainless steel, according specific requirements of tubes with ultra-high cleanliness for semiconductor preparation devices, the content of C should be controlled to be minimum, that is, C≤0.010%, and the content of hazardous elements in the materials should be as low as possible, that is, P≤0.02%, S≤0.010%, Mn≤0.10%, Si≤0.30%, Al≤0.010, H≤0.0002% and O≤0.0015%; Cr16.50-17.00%, Ni14.50-15.00%, Mo2.20-2.50%, Cu≤0.20% and N≤0.010%; the components meet allowable deviation requirements of chemical components of GB/T222 steel; to guarantee accurate control of alloy elements in stainless steel, particularly strict control of non-metallic inclusions, after hot metal pretreatment including S removal, Si removal and P removal, EAF melting, K-OBM-S smelting, vacuum oxygen decarburization (VOD), and external LF refining are performed to reduce the content of hazardous elements such as P, S, Mn, Si and Cu, and O and H in stainless steel to 80%; and then, the tube is machined to specified sizes and specifications through vacuum induction melting (VIM), vacuum arc remelting (VAR), forging, hot rolling, hot piercing, and cold working. The obtained stainless steel seamless tube is high in purity and uniform in austenitic metallographic structure. The electrolytic polishing and passivation effect of the 316L stainless steel which is melted under strict control is optimal, and after being electrolytically polished, the tube is inspected and packaged in a clean workshop, and the delivered 316L stainless steel tube should not only meet related mechanical and physicochemical indicators, but also meet the requirement for ultra-high cleanliness.

To fulfill the above objective, the content (%), by mass, of chemical components of the 316L stainless steel seamless tube is preferred as follows.

On the basis of 316 stainless steel, N is added to improve the ferrite equivalent and minimize the carbon content, and the deviation of elements Cr, Ni and Mo is strictly controlled; meanwhile, considering the purification and refining process of stainless steel, the content of impurity elements P, S, Mn, Si, Al, and gases such as H and O is controlled to be minimum, the content of O and H that have an influence on endurance strength and fatigue strength is controlled to reduce the pollution to the transported gas, the hazardous elements are controlled to be minimum through VOD refining and VAR and vacuum pressure furnace refining, such that the comprehensive performance requirements for surface quality and mechanical properties are met.

The chemical components of the material determine the structure and performance of the material, and the chemical components of austenitic stainless steel are preferred to realize accurate control of the structure and performance of the material.

C: C≤0.010%. C is an interstitial element and is also an element that can intensely enlarge an austenite region, and the nickel equivalent of C is 30; C has a remarkable effect on improving the strength of austenitic stainless steel; however, C and Cr are likely to be chemically combined to generate chromium carbide, leading to chromium depletion of an austenitic grain boundary, which drastically reduces intercrystalline corrosion resistance. So, the most effective measure to prevent intercrystalline corrosion is to reduce the content of C. Moreover, the fluctuation of the content of C has a great influence on the equivalent value of austenitic stainless steel. The increase of the content of C can improve the mechanical property, but formed carbides may be precipitated, which makes a certain amount of gas left in lattices, compromising the purity of transported gas. If the content of C is too high, gases inside and outside the tube may be infiltrated to each other due to the breathability of a welded part of the stainless steel tube, destroying the purity, dryness and cleanliness of the transported gas. So, the content of C is controlled to be less than or equal to 0.010%.

Si: Si≤0.30%. Si is a strong ferrite former, has an deoxidation effect when stainless steel is melted, and can improve the strength, elastic limit, yield strength and yield ratio of austenitic stainless steel; but it can form fine and dispersive $SiO_2$ particles on the surface of steel, and these fine particles may pollute pure gas transported in the tube. In order to improve the oxidization resistance, the content of Si is controlled to be less than or equal to 0.30%.

Mn: Mn≤0.10%. Mn is an austenite stabilized element and is an effective element for restraining hot-working brittleness caused by S and deoxidation during melting. When stainless steel is melted, Mn and S form MnS, the increase of Mn in the steel will improve the quantity of Mns, which may cause pitting corrosion and crevice corrosion when mixed with corrosive gas. In addition, Mn in Cr and Mo stainless steel will promote the precipitation of brittle phases such as the σ phase, and reduce the plasticity and tenacity of the steel. Thus, the content of Mn is controlled to be less than or equal to 0.10%.

Cr: 16.50-17.00%. Cr is a ferrite former, is dissolved in a Fe matrix in austenitic stainless steel to improve the electrode potential of the matrix, and can prevent metal ions from being diffused outward and prevent oxygen atoms from being diffused inwards by forming a compact $Cr_2O_3$ protective film. However, Cr, as a ferrite former, can form a continuous solid solution with Fe to reduce the austenite phase region. By decreasing the deviation of the content of Cr, the Cr/Ni equivalent ratio can be accurately controlled. Thus, the content of Cr is controlled to 16.5%-17.0%.

Ni: 14.50-15.00%. Ni is an element that can enlarge the austenite phase region, and can improve the potential and purification trend of austenitic stainless steel. In order to control the content of ferrite in steel to be less than or equal to 1%, a solidification mode at high temperature gradually changes into a fully-austenitic solidification mode with the increase of the content of Ni. Ni in steel can restrain the formation of the σ phase, which promotes the formation of the $Cr_2N$ phase to some extent. By decreasing the deviation of the content of Ni, the Cr/Ni equivalent ratio can be accurately controlled, and the content of Ni is controlled to 14.50%-15.00%.

Mo: Mo2.20-2.50%. Mo is a refractory metal and a ferrite stabilized element, and can improve the capacity to resist pitting corrosion of austenitic stainless steel. Mo also has the effect of restraining grain boundary precipitation of Cr carbides, and can reduce the solubility of C in austenitic stainless steel and accelerate the formation of $Cr_{23}C_6$. However, too much Mo will promote the precipitation of the σ phase at high temperature, leading to brittleness; moreover, because Mo is a precious metal, the cost will be increased if the content of Mo is too high. Thus, the content of Mo is controlled to 2.20%-2.50%.

P: P≤0.02%. P can promote grain boundary corrosion and reduce grain boundary strength, leading to corrosive degradation in transported gas. Thus, the content of P is controlled to be less than or equal to 0.02%.

S: S≤0.010%. S can lead to grain boundary corrosion and reduce grain boundary strength, so the content of S is preferably less than or equal to 0.0010%.

N: N≤0.010%. N is an element that can intensely enlarge the austenitic region, has a nickel equivalent of 30, and can strengthen solid solution, reduce stacking fault energy in steel, improve the stability of the austenite structure, restrain the precipitation of carbides and delay the precipitation of the α(χ) phase. Ni can also improve the hardness and corrosion resistance of austenitic stainless steel subjected to solution treatment, and can decrease the diffusion rate of Cr and C in austenitic stainless steel and restrain the coarsening of $Cr_{23}C_6$. Thus, the content of N is controlled to be less than or equal to 0.101%.

Cu: Cu≤0.20%. Cu is an austenitic stabilized element, and by adding Cu in stainless steel during melting, the grain boundary corrosion capacity and corrosion resistance of austenitic stainless steel can be improved. However, Cu will form a large quantity of fine and dispersive copper in stainless steel after high-temperature aging, leading to cracks during hot-working and welding, so the content of Cu should be strictly controlled. Thus, the content of Cu is controlled to be less than or equal to 0.20%.

Al: Al≤0.010%. Al is closely affinitive with oxygen and nitrogen, and is a deoxidation nitrogen-determination agent for steelmaking. When the content of Al subjected to solution treatment exceeds a certain value, austenitic grains may grow and be coarsened, so the content of Al should be strictly controlled. Thus, the content of Al is controlled to be less than or equal to 0.010%.

Nb: Nb≤0.010%. Nb is a strong carbide stabilized element, and exists in stainless steel in the form of NbC and Nb(CN), has a pinning effect on precipitated materials to prevent the grain boundary from moving, and can drag solute Nb atoms to prevent recrystallization, thus refining grains. Nb can improve the strength and intercrystalline corrosion resistance of stainless steel. Thus, the content of Nb is controlled to be less than or equal to 0.010%.

Ti: Ti≤0.010%. Ti is a strong carbide former, functions as a deoxidizer in steel, and may form inclusions. Ti can also make the internal structure of steel compact, refine grains, reduce aging sensitivity and cold brittleness, and improve the intercrystalline corrosion resistance of steel. Thus, the content of Ti is strictly controlled to be less than or equal to 0.010%.

Se: Se≤0.010%. The solubility of a compound formed by Se and Fe in steel is extremely low, so sulfide inclusions may be formed in steel, and the effective content of Mn, Ti and Zr and the hardenability of steel may be reduced; selenide particles are finer and more dispersive than sulfides, and can generate tiny particles on the surface of a high-purity gas tube for semiconductors. The content of Se is strictly controlled to be less than or equal to 0.010%.

O: O≤0.0015%. O is left in steel after stainless steel is externally refined. The influence of O on steel is mainly related to the component, property, distribution and quantity of oxide inclusions, and all inclusions reduce the plasticity, tenacity and fatigue strength of steel to different extents, and particularly will be released during high-purity gas transportation, leading to pollution to the transported gas. Thus, O should be controlled as a hazardous element, and the content of O is controlled to 0.0015%.

H: H≤0.0002%. H is left in steel after stainless steel is melted, and is a hazardous element. The content of H should be minimized to prevent various defects and performance degradation caused by H, and particularly, H has a great influence on the fatigue strength and service life of steel, and will be released during high-purity gas transportation. Thus, the content of H is controlled to be less than or equal to 0.0002%.

Regarding component control and optimization, metallic components determine the structure and performance of the stainless steel seamless tube with ultra-high cleanliness.

The invention provides a stainless steel seamless tube with ultra-high cleanliness for an integrated circuit and an IC industry preparation device and a method for preparing the same. The stainless steel seamless tube comprises, by mass, C≤0.010, P≤0.02%, S≤0.010%, Mn≤0.10%, Si≤0.30%, Cu≤0.20%, Al≤0.010%, H≤0.0002%, O≤0.0015%, Cr16.50-17.00%, Ni14.50-15.00%, Mo2.20-2.50% and N≤0.010%; on the basis of 316L stainless steel, the content of elements is controlled, and the content of ferrite is controlled to be less than or equal to 1% to improve the service requirements of the tube with high cleanliness for a semiconductor preparation device. To improve the ultra-high cleanliness of steel, the stainless steel seamless tube prepared from the above elements, and the balance Fe and inevitable impurities is of preset sizes, and an outer diameter of the tube is 9.53 mm-76.2 mm.

Based on 316L stainless steel, the content of elements formed by a Cr equivalent and a Ni equivalent is controlled to control Creq/Nieq to 1.10-1.30, to reduce the content of ferrite in steel. Then, remaining ferrite in the stainless steel seamless tube is completely eliminated by controlling the degree of superheat of cast steel in the smelting process, the cooling intensity of an ingot during the solidification process, the cooling temperature of a consumable remelting crystallizer, and high-temperature heat treatment re-dissolution of the ferritic phase in the solid state, such that the content of ferrite in the finished 316L stainless steel seamless tube is controlled to 0%.

Because the 316L austenitic stainless steel matrix structure is composed of ferrite formers such as Mo, Cr and Si, and austenite formers such as Ni, Mn, C, N and Cu, the 316L stainless steel seamless tube generally contains a certain amount of ferrite (the content of δ ferrite is 3%-15%). In order to control the content of ferrite in steel to be less than or equal to 1%, the ratio of the Cr equivalent to the Ni equivalent, namely Creq/Nieq, is controlled to control the content of ferrite during metal solidification of the austenitic stainless steel seamless tube, and the content of ferrite of the finally obtained austenitic stainless steel seamless tube is adjusted through component adjustment (Creq/Nieq).

$$Creq=16.5\% \ Cr+1.5*2.2\% \ Mo+1.5*0.1\% \ Si=19.8\%$$

$$Nieq=14.8\% \ Ni+0.5*0.10\% \ Mn+30(0.01+0.01)\% \\ (C+N)+0.3*0.20\% \ Cu=15.51\%$$

Creq/Nieq=19.8÷15.51=1.27. The structure prediction accuracy of 316L stainless steel is effectively improved. Creq/Nieq is controlled to 1.10-1.30; then, remaining ferrite in steel is re-dissolved in the austenitic stainless steel structure through hot rolling, hot piercing and solution heat treatment of the 316L stainless steel tube; and finally, the content of ferrite is minimized through the austenitic stainless steel re-dissolution technique.

Through fine control of the austenite formers in 316L stainless steel, the crystallization mode of the stainless steel is an austenite mode at first; when molten steel is solidified, an austenite phase is generated to realize crystallization to precipitate a γ austenite initial phase; then L+γ+δ occurs; and finally, the molten steel is solidified into γ+δ, and a δ ferrite structure is generated on the grain boundary. By control Creq/Nieq, the content of the key austenite former Ni is finely controlled, nitrogen is added to increase the content of the austenite formers, such that Creq/Nieq is decreased, and the content of ferrite in steel is drastically reduced.

316L is 18-10 stainless steel of a metastable structure, so high-temperature ferrite will inevitably exist in the solidification structure. Based on the study of the precipitation behavior of the ferrite phase in the solidification process of molten steel and the high-temperature diffusion behavior of the ferrite phase in the solid state, the content of ferrite in steel can be greatly reduced by optimizing the degree of supercooling of the molten steel and improving the cooling intensity. Meanwhile, during hot rolling of the steel ingot, remaining ferrite in the steel ingot is sufficiently re-dissolved into the austenite structure at normal temperature through high-temperature solution heat treatment by optimizing the forging process, so the content of ferrite in stele is controlled to be less than or equal to 1%.

Based on the grain size control technique during stainless steel processing, an intracrystalline twin change and restoration of dislocation occur through the key technique of integrated grain refining including forging—hot rolling—hot piercing—intermediate cold working (rolling deformation+intermediate solution heat treatment)—cold working of finished tube (cold rolling or cold drawing+solution heat treatment of the finished tube) in the process from hot rolling to finish rolling, original coarse grains are changed into fine grains, which can improve mechanical properties and can also improve CSL grain boundaries in unit area. Upon a lot of experiments and studies, coarse grains are generated during casting in the hot working process, dendrites are removed through hammer cogging, repeated forging and hot rolling are performed to obtain a steel bar, the compression ratio of forging is controlled to 3-5, and the grain size reaches level 3 or even finer. A billet is prepared through hot piercing; after cogging, rapid cooling is performed to prevent carbides from being precipitated on the grain boundary; through multi-pass expanding/drawing, rolling deformation accumulation and solution heat treatment, the grain size and morphology of the cold-worked tube are further controlled to enable the carbides to be fully melted in an austenitic stainless steel solid solution, such that the grains are refined. A correlation function between allowable deformation of hot-rolling piercing deformation and cold working deformation and the number of working stations for rolling formation is established, the distribution law of loads and deformation of the working stations during the piercing and rolling process of the stainless steel tube is figured out, and through reasonable adjustment of deformation allocation of piercing and rolling, deformation accumulation and matching solution heat treatment, the grains are refined, the structure is uniform, and the grain size is controlled to level 5-7.

The growth density of a surface oxide film has a great influence on crystal orientation. In order to improve the level of grain size and the intercrystalline corrosion resistance, different crystal surface face oxidation rates are analyzed, and the grain oxidization will be more intense with the increase of the stacking density. The dissolution rate of steel is in reverse proportion to the atom stacking density, the growing rate of the oxide film on a close-packed plane of steel will be higher with the decrease of the dissolution rate of the close-packed plane, the processing stress is eliminated through deformation accumulation of multi-pass cold rolling or cold drawing and sufficient solution heat treatment, such that the grain size is smaller; and fine grains are formed through final cold-rolling of the tube, and a morphologic structure with more closely-packed planes parallel to the outer surface is formed after the finished tube is subjected to heat treatment, such that the intercrystalline corrosion resistance is improved.

The quantity of $M_{23}C_6$ phase can be drastically reduced by decreasing the content of C in steel, but the strength of steel will be reduced at the same time. The addition of a small amount of stable elements Ni and Ti can stabilize free elements C and N in steel, thus improving the intercrystalline corrosion resistance; through accurate control (the control accuracy reaches ±0.002%) and matching of C, Ni and Ti during melting, the trend of intercrystalline corrosion of steel is avoided. Meanwhile, by controlling the single-pass deformation of cold rolling and selecting a proper finish rolling deformation, the generation of a large number of random grain boundaries will be avoided after solution heat treatment, grain boundaries will reach with each other to generate a large number of low-energy grain boundaries, and the lattice interconnectivity is further dispersed, thus improving the intercrystalline corrosion resistance. So, through the accumulation of multi-pass rolling, the grains are refined, and the intercrystalline corrosion resistance of the 316L stainless steel seamless tube in the 650° C.*2 h sensitized state is improved.

Considering that the tube for an integrated circuit and electronic chemical preparation needs to be welded when installed later and the welding heat affected zone will affect sentitization, the 316L stainless steel seamless tube should have the capacity to resist intercrystalline corrosion in the 650° C.*2 h sensitized state. In terms of the classic metallurgical physical theory, the quantity of the $M_{23}C_6$ phase can be reduced at high temperature by decreasing the content of C, but the strength of steel will be reduced at the same time; by adding a trace amount of stable elements Ni and Ti, the free elements C and N in steel can be stabilized; and through accurate control (the control accuracy reaches ±0.002%) and matching of C, Ni and Ti during smelting, the trend of intercrystalline corrosion of steel can be avoided. The addition of Ti will lead to the formation of inclusions, so the content of Ti should be strictly controlled. The content of Ni and Mo used as carbide formers can be increased to improve hot strength and corrosion resistance, reduce the solubility of C in steel in γ, and accelerate the formation of an $M_{23}C_6$ phase; by properly increasing the content of N, which has a high binding capacity during high-temperature long acting and can be dissolved in the γ matrix to decrease the diffusion rate of Cr and C to restrain $M_{23}C_6$ coarsening, within limit, a solution strengthening effect can be realized, thus remarkably improving the fatigue resistance and fracture toughness of steel and improving the capacity to resist intercrystalline corrosion of the 316L stainless steel seamless tube in the 650° C.*2 h sensitized state.

To meet the comprehensive performance requirements for mechanical properties, grain size, intercrystalline corrosion, ferrite content and surface quality, alloy elements in steel are optimized and accurately controlled in terms of the design thought of micro-alloyed 316 stainless steel, to adapt to the non-metallic inclusion purification metallurgical technology and realize multi-indicator control and collaboration; then, carbides are fully dissolved in austenitic stainless steel through hot working, intermediate deformation cold-rolling and matching solution heat treatment of the stainless steel material of a fully austenitic structure, and the basic requirements for mechanical properties, grain size, intercrystalline corrosion, ferrite content and surface quality are met.

To make 316L austenitic stainless steel with ultra-high cleanliness meet the requirement for mass production and the requirement for high-purity rust-less smelting, the following process is adopted: hot metal pretreatment including S removal, Si removal and P removal+addition of low-impurity alloy elements for K-OBM-S smelting→VOD melting→LF ladle refining→vacuum induction melting (VIM)→vacuum consumable refining (VAR) V/V.

Stainless steel refining process: first, hot metal is pre-treated for S removal, Si removal and P removal, and alloys are added for primarily smelting in an EAF, the tapping temperature is higher than or equal to 1670° C., the components of molten steel are uniform, and stainless steel pre-melt is prepared; then, oxygen is pre-blown to a K-OBM-converter, boiling decarburization and strong bottom-blowing stirring control are performed to make the content of C less than or equal to 0.9%; next, VOD melting is performed, a high-aluminum alkaline refining slag is added to enable slag to adhere to the steel surface, so as to make the content of Al less than or equal to 0.03% and the content of oxygen less than or equal to 0.0030%; then, LF refining is performed, weak argon-blowing stirring is performed to remove small inclusions by bubbles to control the content of Al in steel to 0.012%-0.018%, ensuring that the content of oxygen in the steel is 0.0011%-0.0020%, the content of H in the steel is 0.0005%-0.0010%, such that non-metallic inclusions in molten steel are distributed dispersively; the degree of superheat during casting is reasonably controlled, and the solidification process is controlled.

Through hot metal pretreatment including S removal, Si removal and P removal, impurity elements are removed during smelting, so lime slag-making materials for removing Si and P during steelmaking are reduced, the quantity of slag is reduced, the content of S is decreased to 0.05%-0.06%, the content of Si is decreased to 0.3%-1.0%, the content of P is decreased to 0.14%-0.3%, and the content of C in the molten steel is 4%-6%, thus lowering the difficulty of treating hazardous elements in the subsequent smelting process.

Through alloy melting in an EAF, hot-metal pretreatment including S removal, Si removal and P removal, and the K-OBM-S converter, the temperature of molten steel is T≥1450° C. An excessive temperature drop is avoided during converter blowing.

Oxygen is pre-blown when smelting is started in the K-OBM-S converter, blowing is adjusted with a large quantity of oxygen, boiling decarburization and strong bottom-blowing stirring control are performed, and the smelting temperature is increased to about T=1700° C. to remove most C. When the content of C is less than or equal to 1.20%, top nitrogen blowing is adopted to control the temperature of molten steel, and bottom oxygen blowing and strong stirring are adopted to effectively restrain the oxidization of Cr when decarburization is adjusted.

As mentioned above, the K-OBM-S converter adopts strong stirring based on top oxygen blowing and bottom oxygen and nitrogen (argon) blowing for decarburization, such that the decarburization rate is increased and the loss of Cr is reduced; during oxygen pre-blowing and boiling decarburization, bottom-blowing strong stirring is controlled to control the vacuum degree in this process. Through reasonable control of the stainless steel slag system, the inclusions are controlled within a low melting point range to promote the inclusions to float rapidly to be removed; Ni alloy is added, so the temperature is maintained at 1680-1750° C., and the decarburization rate is 0.15-0.3% min; the content of C in the steel is reasonably controlled to reduce the decarburization pressure during VOD smelting. Hazardous elements P and S are removed at the same time. Slag is blocked during steel tapping, such that the cleanliness of steel is improved.

To meet the requirements for ultralow content of O and fine inclusions, after molten steel in the VOD furnace is poured into a tank, the argon flow is adjusted until the molten steel turns slightly, and then the tank is closed; the flow is controlled to 12-25 NL/min, vacuumizing is performed to control the vacuum degree to be about 15 Kpa, and the distance from a nozzle of an oxygen lance to the liquid level is adjusted to 900±100 mm. First, oxygen is blown to a high-carbon region for about 2 min to remove Si and a small quantity of C. Then, decarburization is started. During oxygen blowing, the oxygen pressure is controlled to 0.37-0.42 Mpa, the flow rate is 120 m³/h, the average decarburization rate is 0.0188%-0.0125%/min, strong argon-blowing stirring is adopted, and the bottom argon blowing intensity reaches 0.01-0.02 Nm³/(t·min), such that the decarburization rate can be remarkably increased, and the oxidation loss of Cr is reduced. To reduce the content of C in steel, oxygen blowing is stopped when the content of C reaches 0.08%, and strong bottom-blowing stirring is performed under a high vacuum degree to remove H, O and N; then the vacuum degree is decreased properly, and the decarburization time is controlled to 15-30 min.

To make the inclusions of steel fine and dispersive, during VOD melting and slagging, the argon flow rate is 30-60 NL/min, and the low-vacuum slagging time is controlled to be longer than or equal to 10 min. First, Al shots with a good deoxidation effect is used as a strong deoxidant, and by adding deoxidant Al shots (content≥99.7%), the deoxidation of steel is guaranteed. After Al deoxidation, CaO and MgO are added, and the alkalinity is controlled, bottom-blowing strong stirring is performed to make an deoxidized product exist in the molten steel in the form of an Al₂O₃ inclusion, such that the quantity of the Al₂O₃ inclusion in the molten steel is greatly increased; high-aluminum refining slag which comprises 40%-60% of CaO, 10%-20% of SiO₂, 6%-12% of MgO and 15%-25% of Al₂O₃ and has an alkalinity of r2-3.5 is added, large inclusions are absorbed by the slag and float with the slag to be removed, such that the inclusions in the steel are changed from composite inclusions into pure magnesium aluminate spinel inclusions; and the content of hazardous elements such as P, S, Si and Al in stainless steel is further decreased, and the content of O and H is further decreased through VOD refining.

During LF steel ladle refining in Step a, a slag system with a high MgO content and a high Al₂O₃ content is formed to further remove O and H in steel; then, weak argon stirring is performed to remove 10 µm or even smaller inclusions through bubbles, and the small inclusions collide one another and are gathered to form large-grained inclusions more rapidly, so the inclusions float rapidly to be removed; and through strong deoxidation with Al powder, slag system optimization, calcium treatment and weak stirring, the content of Al in the steel is controlled to 0.012%-0.018%, thus ensuring that the content of oxygen is less than or equal to 0.0015% and the content of H is 0.0002%-0.0005%, thus meeting the requirements for ultralow oxygen, fine inclusions and dispersive refining of 316L steel, remarkably improving the purity, mechanical properties, fracture toughness and fatigue strength of steel.

The liquidus temperature of the molten 316 stainless steel is figured out, and the degree of superheat of continuous casting is reasonably controlled. After VOD refining is finished, hermetic continuous casting is performed, such that atmospheric pollution is prevented, and the oxygen content of the atmosphere in the ladle is made to be less than or equal to 0.1%; oxygen in the molten steel is increased during continuous casting, the solidification process is controlled, and the quantity of ferrite formed in the solidification process is reduced, such that macrosegregation and inter-dendritic segregation are effectively controlled. Covering slag is hung, and the use effect of a fully hermetic protection cover is guaranteed.

To meet subsequent VIM requirements, the external dimension of the ingot must meet corresponding requirements, so after being discharged out of a mold, the surface of the ingot is polished to be smooth, and various defects and impurities are removed.

To meet intercrystalline corrosion test requirements, carbides are fully dissolved in austenitic stainless steel by controlling the intermediate deformation cold-rolling and solution heat treatment process under the condition that the nickel equivalent is within limit, thus meeting the basic requirements of intercrystalline corrosion sensitization tests.

Vacuum induction melting (VIM) and vacuum consumable remelting (VAR) process: C, O, H and low-melting point inclusions are removed through heating melting and argon-blowing strong stirring under a high vacuum degree of VAR, and then power is cut off to realize condensation in the furnace to enable O and H to be further released from molten steel. Power supply resumes to increase the temperature, and a low-melting point and high-hardness slag system is added to the steel under the condition of argon-blowing stirring to gather S, H and O on the surface of the motel steel, and different compounds formed by low-melting point elements are removed by slag. With the steel ingot obtained through VAR as an electrode for vacuum consumable remelting, the steel is further purified in the process of melting the electrode to form liquid drops/washing and solidifying slag, and the temperature of cooling water in a crucible in the steel is controlled to control the content of ferrite to be less than or equal to 0.5%. Chemical components in the re-melted steel are checked. If the chemical components are not qualified, vacuum consumable remelting is performed again until the content of H in steel is less than or equal to 0.0002% and the content of O is less than or equal to 0.0015%;

To meet the comprehensive performance requirements of ultra-pure 316L stainless steel, the VIM process is as follows: charging→heating for melting→holding for refining-→condensation→deoxidation and desulfuration→casting.

A CaO crucible is used to reduce oxygen supplied to the crucible; during VIM, furnace charge is heated to be red with low power first and is then melted as quick as possible with high power under a certain vacuum degree, the melting rate is controlled to 1500 kg/h, the final temperature of steel is controlled to be lower than or equal to 1650° C., melting is performed under a vacuum condition, and to fulfill a decarburization and deoxidization effect during melting, no protective gas is added, the carbon-oxygen reaction degree is effectively controlled merely by opening or closing a vacuum valve, and melting is performed normally, such that the purpose of decarburization and deoxidization is realized. Meanwhile, sampling is performed to make a preparation for adjusting chemical components of alloy in the refining phase.

VIM: the molten steel is controlled to 1620-1670° C. and is refined under a vacuum condition of 4-10 pa for 15-21 min; all high vacuum pumps are started to pump air under argon-blowing strong stirring to improve the vacuum degree, and the C—O partial pressure is effectively reduced under high temperature and high vacuum degree, so a product of carbon content and oxygen content is reduced; after the chemical components are adjusted, stirring is performed for a period of time to make the components of the molten steel uniform; C, O, H and low-melting point impurities in the molten steel are removed from a surface of the molten steel, and then, metallic components of the molten steel are adjusted to ensure that the impurities in the 316L stainless steel are minimized and the components of the molten steel are uniform.

Power is cut off to enable 316L stainless steel to be condensed in the VIM furnace; when power is cut off to cool the molten stainless steel to 1450-1490° C., the molten steel is condensed to reduce the solubility of O and H in the molten steel, such that dissolved gas appears on the surface of the molten steel and is released from the molten steel.

Power is supplied to the VIM furnace again to increase the temperature until the temperature is slightly higher than the melting point 1545±10° C. of the stainless steel, and $SiO_2$ and desulfurizing agents CaO and MgO are added to the steel under the condition of argon-blowing stirring to form a low-melting point and high-alkalinity slag system, which comprises, by mass, 45% of CaO, 18% if $SiO_2$, 6% of MgO and 30% of $Al_2O_3$ and has an alkalinity of (r)2-3.0; when $SiO_2$, CaO and MgO are added, stirring is performed to enable the inclusions to be further adsorbed by the slag and float with the slag to be removed, such that O, S and H gathered on the surface of the molten steel are effectively removed finally. Vacuumizing is performed at this temperature for 5±1 min until the vacuum degree is less than 5 pa, and different compounds formed by Mo, Ca, C, Al, P, S, Si, As and other low-melting point elements in the molten steel float with the slag to be removed.

Upon a lot of experiments and studies, the nitrogen uptake rate of the molten steel increases with the increase of the partial pressure, and the solubility increases with the decrease of temperature. The nitrogen content of the molten steel is detected, and the actual nitrogen-blowing pressure and time are determined according to the actual nitrogen content, the nitrogen-blowing pressure is controlled to 50-100 kpa, and the nitrogen-blowing time is controlled to 5-30 min. The mechanical properties of ultralow-carbon stainless steel need to be controlled by increasing the nitrogen content, so the nitrogen control should be controlled to an upper limit of the deviation.

Casting is the last process of 316L stainless steel smelting. To obtain a high-quality 316L stainless steel ingot, a suitable low casting temperature between 1450° C. and 1480° C. should be selected to decrease the cooling rate of the ingot during the solidification process of molten steel, reduce the content of ferrite, and make the size of the ingot small; the cooling temperature decreases gradiently from the center to edge of the ingot, the ferrite content of the core is high, and the size of the core is large, and in the aspect of optimizing the solidification rate, the ferrite in the core of the ingot is effectively controlled. Then, two layers of slag blocking and ceramic filtering are performed to guarantee the purity of the molten steel and improve the cleanliness of the molten steel. The surface smoothness of the stainless steel ingot is improved, and shrinkage cavities in the stainless steel ingot are avoided. A high-quality vacuum 316L bar with a diameter of 550 mm and weight of 6 tons can be produced.

After being refined in the VIM furnace, impurity elements in steel are remarkably reduced, which is beneficial to the control of impurity elements in the ingot and the electrode melting uniformity in the smelting process. The surface of the ingot is polished and cleaned, and the ingot is machined into a consumable electrode for VAR smelting.

The consumable electrode is disposed at a lower end of a lifting spindle of a vacuum consumable furnace and is conveyed into a crucible of the vacuum consumable furnace, and an electrode X-Y adjustment system can guarantee that smelting ring gaps are consistent. The vacuum furnace is sealed, and the vacuum degree of the vacuum furnace is maintained at 0.08 pa in the whole smelting process;

As mentioned above, the VAR furnace is electrified to generate arc discharge between the consumable electrode and an arcing agent disposed at the bottom of the crucible to completely melt slag and guarantee required temperature, thus effectively improving the surface quality of an arcing section of an electroslag ingot. After a molten bath is formed, the smelting power is increased gradually, and in the subsequent smelting stage, the voltage is controlled to 30.0-44.0 v, the current is controlled to 2.0-2.4 kA, and the melting rate of the consumable electrode is controlled to 1.0-2.0 kg/min; and the temperature of liquid slag is maintained by controlling the water inflow of a bottom water tank and a crystallizer, to improve the surface quality and reduce power consumption. The cooling water flow rate of the electroslag ingot crystallizer is increased, and the water inlet and outlet temperatures of the crucible are 30-35° C. to ensure sufficient heat supply to the liquid slag and a stable melting rate in the vacuum consumable remelting process, the content of ferrite in steel is remarkably reduced, and the surface quality is good. Through the design of helium cooling and a jet steam jacket, segregation of alloy elements is controlled, the effectiveness of conductivity between the electroslag current and a copper plate of the bottom water tank is improved, and segregation of the ingot can be minimized; and feeding process is optimized to ensure that sufficient molten liquid is supplemented to the heat of the electroslag ingot, shrinkage cavities are reduced, and the yield is increased.

In the solidification process of melting the electrode to form liquid drops/washing and solidifying slag, the electroslag in the consumable furnace is subjected to a series of metallurgical reactions. According to the 316 remelting law, low-alkalinity refining slag which comprises 17% of CaO, 22% of SiO 3% of MgO and 15% of $Al_2O_3$ and has an alkalinity of r1.0-1.5 is used during the vacuum consumable remelting process, chemical components of the ingot change to different degrees before and after remelting, and the components of refining slag are controlled within a low-melting point range, such that the purity of the steel is remarkably improved. Al powder is added during slagging to consume oxides in liquid slag, inclusions are removed through slag washing and floating in the molten bath, and vacuum consumable remelting can improve the cast structure of steel and reduce component segregation. When the remaining weight of the consumable electrode is 20%, final hot-topping is performed, the current is gradually reduced to 1.4-1.8 kA to maintain an electric arc and perform smelting feeding, the voltage is controlled to 22.0-25.0V, the melting rate of the consumable electrode is controlled to 1.0-1.5 kg/min, the melting rate of the consumable electrode is controlled to 1.0-1.5 kg/min, the water inlet and outlet temperatures of the crucible are controlled to 30-32° C., and argon is introduced for protection in the whole smelting process to the end of smelting.

Vacuum consumable remelting is performed again, and control is performed as mentioned above to minimize hazardous elements C, Si, Mn, Al, Cu, P and S, and O and H in the steel. The remelting processing including welding, arcing, smelting and filling during vacuum consumable remelting is controlled by a computer to guarantee accurate control of metallic chemical components. Data is recorded in real time, a tread chart is generated and can be observed in real time and stored automatically, so the long-term traceability of the product is maintained.

The ingot is continuously cooled to be lower than or equal to 400° C. under a vacuum condition and is then discharged.

The consumable electrode is quickly melted under the high temperature action of a DC arc and is solidified in the water cooling copper crucible in the form of liquid drops, such that the components of 316L stainless steel are uniform, the crystalline structure and ingot quality are improved, shrinkage cavities and puff zones in the head of the ingot are reduced, and a stainless steel ingot with ultra-high cleanliness is provided. Meanwhile, through the refining technique that can realize low content of H and 0 and low content of impurities including Al, P and S, refining and dispersive distribution of DS inclusions are realized.

Upon analysis of the precipitation behavior of the ferrite phase in the non-equilibrium solidification process of molten steel and the high-temperature diffusion behavior of the ferrite phase in the solution state during VIM and VAR, the surface cooling intensity of the ingot is high, the content of ferrite is low, the size is small, the temperature diffusion in the ingot is unlikely to occur, and the internal cooling intensity of the ingot is lower than the surface cooling intensity of the ingot. The degree of superheat of the molten steel and the cooling water flow rate of the electroslag crystallizer are optimized, such that the content of ferrite is obviously reduced.

In the ultra-pure smelting process including hot metal pretreatment and addition of low-impurity alloy addition→K-OBM-S converter→VOD refining→LF ladle refining→V AM→VAR V/V, different slag systems and the refining process capable of realizing ultralow oxygen and fine and dispersive inclusions of stainless steel are adopted, the silicon deoxidation process of VOD eliminate large inclusions in steel, a high-content $MgO+Al_2O_3$ slag system is prepared through LF and intense aluminum and magnesium deoxidation is used, such that large inclusions are eliminated, and the inclusions are changed from composite inclusions into pure magnesium aluminate spinel inclusions; $SiO_2$ and desulfurizing agents CaO and MgO used for VIM, the low-melting point and high-alkalinity slag system and the low-alkalinity refining slag system for vacuum consumable remelting enable non-metallic inclusions in 316L stainless steel to be adsorbed by slag and float with the slag to be removed, the content of O and H in steel is ultralow, the DS inclusions are fine and dispersive, and the purification requirements of the non-metallic inclusions in 316L steel for a semiconductor preparation device are met.

Stainless steel forging process: round billets are prepared through steel ingot forging and continuous steel bar rolling. On the basis of process simulation and analysis, steel bars are manufactured by means of an existing batch-type furnace through natural gas heating, quick forging and hot rolling, and through coupled control of a full-size temperature field and a strain field of forged pieces, forging dendrites are eliminated, the phase size is refined, the content of ferrite is reduced, the mechanical properties are remarkably improved, and the structure with hardness HV≤200 is obtained.

The ingot is heated in the 4 m*6 m batch-type furnace, and refractory bricks are placed at the bottom of the ingot to reserve a gap between the ingot and the bottom of the furnace, such that the ingot can be heated more uniformly. Slow heating is adopted, such that the situation that the heating temperature of the surface is too high while the internal temperature does not meet requirements is avoided. The heating time and the holding time are prolonged in a soaking zone. In the aspect of temperature control, the thermoplastic processing temperature is 1100-1180° C.; considering the temperature drop, deformation manner and heating number during forging, incomplete recrystallization will be caused if the final forging temperature is too low, leading a hybrid grain structure with non-uniform grain sizes, so the final forging temperature needs to be higher than or equal to 920° C., otherwise, remelting should be performed in time.

In the primary forging process, the ingot should be knocked gently and is hammered and rolled to quickly crush surface columnar crystals through a 25 MW quick forging press, the deformation amount is controlled mainly through small deformation, and when the surface columnar crystals are crushed and the deformation is greater than 30%, forging deformation is increased at proper temperature. If the deformation of one time of heating is small, the crystals will fall into a critical deformation zone, and the grain sizes will be non-uniform. The ingot is rounded in the final pass of heating, and the critical deformation is controlled to be greater than 15% to guarantee that the structure is uniform. The total compression ratio of forging is 3-5. After being forged, the ingot is placed back into the furnace to be heated again until the temperature reaches 1160° C.±20° C., the internal temperature and external temperature of the forged piece along the cross-section are kept consistent, such that the situation that the outside of the forged piece reach the required temperature while the inside of the forged piece does not reach the required temperature and consequentially, various defects are caused is avoided.

During heating of the stainless steel forged piece, the stainless steel forged piece is rolled into stainless steel bars with a diameter of 65 mm, a diameter of 115 mm and a diameter of 135 mm through a bar mill, the outer diameter tolerance is controlled to ±0.1 mm, and the ellipticity is less than or equal to 0.12 mm. The heating temperature and deformation are controlled during forging and rolling to improve process control of the compression ratio, such that the total compression ratio of forging is controlled to 3-5 to obtain a uniform grain structure and eliminate ferrite in steel.

Hot piercing process: the heating curvature, holding time and turning time of all temperature sections of a sloping hearth furnace are controlled, wherein the heating temperature is controlled to 1160° C.-1220° C., the heating time is controlled to 140-290 min, a stress-strain field and a temperature field corresponding to large-angle cross piercing and a temperature field corresponding to top piercing are analyzed and controlled to realize coordinated control of hot pricing formation and structure performance, to produce qualified billets. To meet the requirements for mechanical properties, grain size and intercrystalline corrosion of ultra-pure 316L stainless steel, the allowable deformation matches the number of passes of rolling formation, the hot-piercing and cold-rolling deformation allocation and performance control law is mastered, and the ultra-pure stainless steel tube with good mechanical properties, intercrystalline corrosion resistance and fine grains is obtained.

A hot piercing—intermediate cold rolling—finish cold rolling relation function, a corresponding matching model and deformation allocation are established, and a hot piercing—high-temperature intermediate solution heat treatment, deformation and allocation integrated cold deformation control key process is formed. A high intermediate solution heat treatment temperature is used for softening to make a preparation for subsequent machining of the finished cold-rolled tube. Thus, with the deformation and structure performance of the rolled tube as constraints, a cold-rolling deformation and allocation process is formed by combining the rolling hardening effect, the hardening gradient distribution and the pass transmission effect to reasonably allocate the machining deformation of each pass.

Pre-processing of round bars: the steel is sawn into round bars of corresponding weights through cyclone cutting of 1.5 mm-3 mm, a V-shaped centering hole is punched in one end of the round bar, the outer surface of the round bar is inspected, surface defects such as headline cracks are removed through a handheld grinder, and the steel bar is cleaned to remove saponifying liquid and oil stains left on the surface of the steel bar, so as to keep the surface of the steel tube clean;

Hot piercing of stainless steel is a process of turning solid billets into hollow pierced billets under the synergistic action of multiple factors, based on a temperature-stress and strain multi-field coupling digital model in the hot piercing process. In the hot piercing process, the interaction of multiple physical fields happens inside when the solid round billets change into hollow pierced billets, behaviors that can improve the process characteristics under multi-field coupling condition in the hot piercing process are accurately simulated, a sloping hearth furnace heating process system is established on this basis, and the turnover frequency is increased, such that the internal heating temperature and the external heating temperature of the stainless steel bar are kept consistent, crack formation and propagation on the phase boundary caused by improper control of the deformation temperature and the internal and external temperatures consistency are avoided, and piercing cracks are avoided.

As mentioned above, based on the hot piercing characteristics of different calibers of ultra-pure 316L stainless steel, high-quality hot piercing capable of realizing synergetic control of hot piercing formation, structure and performance is realized by optimizing process parameters such as the heating curvature and time of all heating sections of the furnace according to the temperature field change distribution characteristics in the large-angle oblique-rolling stress-strain field and temperature field and top piercing process; hot piercing process parameters such as the billet heating temperature, the holding time, the distance between guide plates, the distance between rollers and the rotational speed of the rollers are selected reasonably to minimize non-uniform deformation of a piercing deformation zone and additional tensile stress caused by the non-uniform deformation, thus realizing high production efficiency and high yield. The technical parameters of the hot piercing process based on temperature-rotational speed matching of the stainless steel billet meet the following conditions: when a diameter of the billet is less than or equal to 65 mm, the outlet temperature of a heating furnace is controlled to 1160° C.-1200° C., the heating time is controlled to 140 min-160 min, the holding time is controlled to 15 min-28 min, and the deformation rate of a corresponding 60 piercing machine is controlled to 89-92 r/min; when the diameter of the billet is 75 mm-135 mm, the outlet temperature of the heating furnace is controlled to 1170° C.-1220° C., the heating time is controlled to 170 min-290 min, the holding time is controlled to 23 min-64 min, and the deformation rate of a corresponding 90 piercing machine is controlled to 74-77 r/min; through immersive rapid cooling of the billet after piercing, a ferritic phase in a solid state is re-dissolved at high temperature into a solid solution at normal temperature, and the content of ferrite in a thickness direction of the tube wall is further decreased gradiently, such that the content of remaining ferrite in the billet is less than or equal to 0.5%.

Intermediate cold working process: the requirement for synergetic control of grain refining and carbides is met through deformation accumulation of multi-pass expanding, drawing and rolling; in the first pass of cold rolling, the grain size is controlled, the coefficient of elongation of deformation is 1.5-2.3, the diameter reduction is controlled to 32%-50%, and the wall reduction is controlled to 30%-55%; in each pass of intermediate expanding, drawing and rolling, the coefficient of elongation is controlled to 1.05-1.7, the diameter reduction is controlled to 10%-40%, and the wall reduction is controlled to 10%-48%; then, intermediate solution heat treatment is performed, and the intermediate solution heat treatment temperature is controlled to 1100±10° C. Finish rolling cold-working: the grain size of the tube is inspected, the coefficient of elongation of deformation of a precise cold-rolling tube mill is 1.2-1.6, the diameter reduction reaches 12%-31%, and the wall reduction reaches 12%-32%; and finally, bright solution heat treatment is performed, and the temperature is controlled to 1080±5° C. Through the solid-state ferrite re-dissolution technique, the content of ferrite is 0, and the surface roughness is Ra≤0.8 μm.

The cold-working process is a short production process mainly based on cold rolling and supplemented by cold drawing, accords with the multi-process and multi-pass cycle of stainless steel tube production, is suitable for various specifications and can reduce process passes and costs. That is, the process requirements for small quantity, multiple batches and multiple specifications are met, the economic performance is good, and the efficiency is high.

It should be noted that cold rolling of the stainless steel seamless tube has an influence on the intercrystalline corrosion performance, the accumulation of multi-pass rolling/drawing deformation makes the deformation of the tube uniform and increases the internal nucleation rate, and the internal grain size is small after solution heat treatment and recrystallization. In case of excessive cold rolling, the recrystallization behavior will be induced during solution heat treatment, a large-scale recrystallization behavior will generate more large-angle free boundaries, which will quickly migrate on a large scale during high-temperature heating and will inevitably react with lattice dislocation, producing straight coherent twin boundaries which are obvious high-angle grain boundaries with continuous lattices and exerting a negative effect on the distribution of grain boundary features, and in this case, grain boundary precipitation is severe, and grains are surrounded by deep corrosion trenches. A dramatic decrease of the grain size will increase the number of grain boundaries, decrease the diffusion distance of carbon-oxygen atoms to the grain boundaries, decrease the concentration of Cr on the grain boundaries, and aggravate intercrystalline corrosion. Small-deformation cold rolling will not generate a large number of random grain boundaries after solution heat treatment, a small deformation can further promote the migration of free grain boundaries to enable the grain boundaries to react with each other to generate a large number of low-energy grain boundaries, the lattice connectivity is further dispersed, the grain boundary features are remarkably optimized, and thus, the intercrystalline corrosion resistance is improved. So, the relation between rolling force and intercrystalline corrosion should be taken into account when the tube is rolled, and on the basis of a proper coefficient of elongation of cold rolling, grains can be fined through the deformation accumulation of multi-pass rolling, and intercrystalline corrosion requirements are met.

Before cold-rolling of the stainless steel tube, the inner and outer surfaces of the billet are polished to reduce surface roughness after cold-rolling of the stainless steel tube; the billet is polished through a coarse wheel to remove surface helical joints, burrs and split particles caused by rough polishing are removed through finish polishing, and after finish polishing, the surface roughness of the tube is improved to Ra≤3.2, ensuring the surface quality of the intermediate-rolled tube.

A temperature which can realize softening through high-temperature solution heat treatment, guarantee a uniform structure and gradually refine the phase size is selected for intermediate annealing to lay a foundation for obtaining a large deformation and preventing the structure against excessive growth, which may otherwise exert a negative influence on the structure and performance control of the tube, and the phase size is continuously refined during cold deformation and intermediate annealing. Meanwhile, the intercrystalline corrosion meets requirements, and the content of ferrite is minimized.

The change of structural values with the intermediate solution heat treatment temperature of the 316L stainless steel seamless tube is optimized, the law of increase of the grain size with the change of the intermediate annealing temperature is figured out, and the solution temperature for refining the grain size of the ultra-pure 316L stainless steel seamless tube is 1080° C.±5° C. On this basis, the value of the heat treatment temperature corresponding to the structural and softening values is detected, and the intermediate solution heat treatment temperature of the ultra-pure 316L stainless steel tube is further optimized.

It is difficult to realize cold deformation of stainless steel, and a tool or mold may slide asynchronously with respect to the surface of the metal tube during tube rolling, causing frictional scratches on the inner and outer surfaces of the tube, so the finally rolled tube cannot meet the requirement for roughness Ra0.8 mm. Circumferentially-spraying forced lubrication is adopted, the flow rate of lubricating oil is increased and is adjustable within 1.5-3 L/s according to the rolling condition, the nozzle pressure is increased to 0.3-0.5 Mpa, and high-viscosity rolling oil is preferred.

Initial rolling is the key process of grain crushing; when a two-roller tube cold-rolling mill is used for rolling, grains are drawn to be fibrous in a deformation direction according to a coefficient of elongation of rolling deformation, which is 1.5-2.3, corresponding to a grain size of the pierced billet, the gradual increase of the dislocation density improves the degree of distortion in the structure, the degree of compression or elongation of the grains is increased, a nuclear driving force and a growth driving force of the grains are remarkably increased, non-uniform gains of the tube are avoided through sufficient cold-rolling deformation, the coefficient of elongation of cold-rolling deformation is 1.5-2.3, the diameter reduction is controlled to 32%-50%, the wall reduction is controlled to 30%-55%, and cold expanding/drawing and cold rolling are combined to realize large deformation and flexible production of cold expanding/drawing. The austenite grain size and morphology are controlled through a large deformation obtained by deformation accumulation; in each pass, the coefficient of elongation is controlled to 1.05-1.7, the diameter reduction is controlled to 10%-40%, and the wall reduction is controlled to 10%-48%; a roller solution heat treatment furnace is used, the solution heat treatment temperature is controlled to 1100° C.±10° C., and the holding time of the tube is controlled to (1.5-2.5)*wall thickness min; the mechanical properties of stainless steel are improved through solution strengthening, the grain refining requirement is met through the accumulation of deformation of multi-pass drawing/rolling, and the large deformation makes the grains of the tube more uniform;

An inner wall and outer wall polishing machine is used for finish rolling of the tube; before rolling of the finished tube, the intermediate tube is coped and then polished with 320-mesh abrasive paper, and under the action of polishing force, the surface of the matrix deforms plastically, and an ultrathin oxide film instantly formed on the metal surface under high-temperature oxidization is polished repeatedly to be removed, such that the tube becomes brighter. The whole polishing process has a mechanical grinding effect, as well as physical and chemical effects, and the roughness of the inner surface of the stainless steel tube is Ra0.8 μm or even smaller.

Due to the requirement for synergetic fine control of multiple indicators of finish rolling of the tube, the variation of values in the cold rolling and solution heat treatment process will change the size and uniformity of grains, the problem of unqualified grain size or "hybrid grains" may be caused, and grain size control becomes the key and difficulty of finish rolling of the stainless steel tube. A two-roller precise tube cold-rolling machine is used, the deformation is accumulated through the previous pass of cold rolling or cold expanding/drawing, other comprehensive performance requirements should be met during finish rolling of the tube, the coefficient of elongation of finish-rolling deformation of the cold-rolled tube is fine controlled, the coefficient of elongation of deformation of the cold-rolled precise tube is 1.2-1.6, the diameter reduction is controlled to 12%-31%, the wall reduction is controlled to 12%-32%, the diameter tolerance of the tube is controlled to ±0.05 mm, the grain size is controlled to level 5-7, the full-wall thickness structure, high performance uniformity and high stability of the stainless steel tube are realized, and the requirements for corresponding outer diameter, wall thickness and tolerance are met. Solution heat treatment of finish rolling of the tube: the temperature is controlled to 1080° C.±5° C., cold-working stress is released under the condition of guaranteeing the length and sectional temperature consistency of the tube, a total-hydrogen radiant tube heating roller type bright solution heat treatment furnace is used, and the tube is quickly cooled after being heated, such that the grains are effectively controlled, work hardening is eliminated, and the structure and performance of the tube are restored; the solution temperature is controlled to 1080° C.±10° C., and the holding time of the finished tube is controlled to (1.0-1.5)*wall thickness min, such that all remaining ferrite is quickly dissolved to the austenitic stainless steel tube.

The precise tube cold-rolling mill is provided with an outer wall cleaning device which works synchronously with edge rolling, and the cleaning rate of the outer wall cleaning device is 3.5-5.5 m/min. The outer wall cleaning device comprises the processes of tube sealing, oil stripping, primary degreasing, secondary degreasing, degreasing fluid removal, primary rinsing, secondary rinsing, water removal, and blow-drying through a circular air nozzle. A polyethylene fiber line is wound on the outer surface of the tube to remove oil on the outer surface of the tube rotationally; during primary degreasing and secondary degreasing, degreasing fluid prepared from warm water and a degreasing agent is sprayed on the surface of the tube, then multiple opposing sponge clamping members rotate oppositely to disperse, emulsify and strip oil on the surface of the tube, and temperature is controlled to 25-30° C.; warm water at 40-50° C. is used for primary rinsing, and oil on the surface is wiped away through opposing chain-drive sponges; during secondary rinsing, the tube is sprayed or washed with high-temperature clean water, the temperature is controlled to 50-60° C., then water on the surface is removed through a water wiper, and finally, the tube is purged through the high-temperature circular air nozzle. The system is automatically controlled through a PLC.

Then, the cold-rolled tube is conveyed from an inner wall cleaning device into a cleaning tank of an inner wall cleaning device, the surface of the tube is immersed in the degreasing fluid, an ultrasonic vibrator at the bottom of the cleaning tank generates ultrasonic waves, which is cavitated, accelerated and flow in liquid to disperse, emulsify and strip dirt; the temperature is increased and proper cleaning balls are added at the same time, the tube is cleaned repeatedly under the action of circulating water, and the time is controlled to 4-9 min. After the tube is cleaned, the degreasing fluid is discharged, and remaining liquid is blown out with compressed air. Then, clean water is injected, and under the action of the ultrasonic vibrator, forward and reverse circulating water is pushed to rinse the tube, the rinsing time is controlled to 2-3.5 min, and finally, the tube is purged with compressed air.

To meet the manufacturing process requirements of the finished tube, a roller-hearth stainless steel tube total-hydrogen bright solution furnace is used to avoid oxidization, decarburization and carburization of the finished tube through the high-temperature anti-oxidant combustion heating technique and the heat treatment technique, such that the surface of the tube is bright and pure. Pure hydrogen is used as a protective gas, such that the heat transfer efficiency can be remarkably improved, and the circulation of the protective gas in the furnace is improved. Hydrogen not only can keep the tube bright, but also has a strong reducing effect, thus improving the finish of the steel tube, and can realize more uniform recrystallization, thus making the mechanical properties of the material more uniform. Natural gas and air are indirectly heated in a ceramic radiant tube, such that waste gas in the ceramic radiant tube is effectively prevented from entering the furnace; the heat treatment furnace is a tunnel-type airtight facility, the furnace temperature uniformity is ±5° C., the temperature control precision is ≤±1° C. The natural gas is used as a combustion heat source to heat the stainless steel tube; the heated stainless steel tube is sprayed with N2 in a special airtight cooling channel to be quickly cooled, and is then slowly cooled through a radiant water-cooling section; an air cooling room adopts a strong convection circulating system, and through the efficient heat-exchange circulating heat technique, the tube is prevented from contacting with air and thus will not be oxidized.

The high-precision stainless steel seamless tube is straightened through an eleven-roller high-precision straightening machine, such that the straightness of the tube is improved. A tube guide cylinder is disposed at a feed inlet, the eleven-roller high-precision straightening machine is composed of pass straightening rollers which face each other and are arranged in a staggered manner, the deviation of the upper and lower straightening rollers is 3.5%-5% of the outer diameter of an inlet tube of the straightening machine, and is adjusted according to the actual straightness after the first tube is straightened, and the diameter tolerance of the cold-rolled or cold-drawn stainless steel tube is ±0.05 mm.

An ultrasonic and vortex integrated non-destructive inspection device is used for non-destructive inspection of the tube, the signal-to-noise ratio is UT≥8 dB, ET≥10 dB, the circumferential sensitivity deviation fluctuation is controlled to be less than or equal to 2 dB, and the thickness measurement accuracy is controlled to ±0.05 mm. The inner wall and outer wall polishing machine is used for polishing the finish-rolled tube, before rolling of the finished tube, the intermediate tube is coped and then polished with 320-mesh abrasive paper, and under the action of polishing force, the matrix generates a high temperature, so the surface of the matrix deforms plastically, and an ultrathin oxide film instantly formed on the metal surface under high-temperature oxidization is polished repeatedly to be removed, making the tube brighter. The whole polishing process has a mechanical grinding effect, as well as physical and chemical effects, and the roughness of the inner surface of the stainless steel tube is Ra0.4-0.6 μm or even smaller.

The roughness and chromium-rich film of the inner surface of the 316L stainless steel tube are manufactured through electrolytic polishing and passivation: through electrolytic polishing, potential phase structures such as deformation strata, dislocation and hole accumulation on the metal surface can be dissolved in an electrolytic cell, such that an equipotential surface is obtained, the surface roughness is reduced, and the brightness is improved. An electrolytic polishing solution in the electrolytic cell is prepared from $H_2SO_4$ with a concentration of 98%, $H_3PO_4$ with a concentration of 85%, and ionized water, and comprises 15%-20% (mass fraction) of $H_2SO_4$, 63%-67% of $H_3PO_4$, a polishing agent, and 12%-22% of $H_2O$, and the proportion of the electrolytic polishing solution is regulated to 1.5-1.7. The water, $H_3PO_4$ and $H_2SO_4$ of the electrolytic polishing solution are added in sequence.

Based on the above electrolytic polishing solution, the stainless tube is hung on a customized fixture, the stainless steel tube in the electrolytic cell is used as an electrolytic anode, an electric heater is used for heating, the temperature of an acid liquor is controlled to 43° C.-70° C., the DC multi-pulse voltage is controlled to be lower than or equal to 30V, and the current density is controlled to 5-50 A/dm, and the polishing solution is stirred for convection to decrease a temperature difference of an electrolyte to prevent the anode from being overheated. The electrolytic polishing time is 5-15 min.

The electrolytic polishing should be in conformity with the regulations of ASTM E1558 Standard Guide for Electrolytic Polishing of Metallographic Specimens and ASTM A380 Cleaning, Descaling and Passivation of Stainless Steel Parts, Equipment and System, and the roughness of the inner surface of the 316L stainless steel tube for a semiconductor preparation device should be controlled to Ra0.13 μm~0.20 μm to improve the smoothness of a passage of the tube.

To improve the use efficiency of cleaning water and guarantee the economic efficiency, water is used level by level according to the water quality, secondary cleaning water is used as rinsing water for primary cleaning, and when water is insufficient, pure water treated by a pure water device can be used.

Key indicators of the pure water treated by the pure water device (reverse osmosis membrane) are as follows: resistivity≥17.5KΩ·cm, total organic carbon (TOC)<20 ppb, silicon dioxide<5 ppb, bacterium≤10 species/100 ml, and the minimum thermal deionization temperature is 176° F. (80° C.).

To ensure that the acid liquor can be quickly removed after electrolytic polishing, the outer surface of the tube is first cleaned in flowing water with an ultrasonic cleaning machine and a cleaning agent, and then, the inner bore of the tube is washed by means of a high-pressure circulating water lance. After being washed, the tube is rinsed, wherein the water temperature is controlled to 60° C.-5° C.; after the tube is rinsed, water on the surface of the tube drains off; and finally, the inner wall of the tube is purged with compressed air.

The tube is rinsed again through the ultrasonic cleaning machine and the cleaning agent with pure water as cleaning water: the rinsing time is 3-5 min, the inner bore of the tube is washed for 1-5 min with high-pressure water, and after the tube is rinsed, water on the tube drains off, and the interior of the tube is purged to remove water.

After electrochemical polishing of the 316L stainless steel seamless tube, the chromium-rich oxide film is formed on the surface of the tube, and the corrosion resistance of the chromium-rich oxide film will be improved with the increase of the content of chromium of the chromium-rich oxide film. To further improve the chromium-rich oxide film, the tube is pickled and passivated, the passivation solution is a $HNO_3$ solution with a mass percent of 20%-35%, the 316 stainless steel tube is passivated in a passivation cell for 10-30 min, and then the $HNO_3$ solution in the tube drains off. Compared with the 316L stainless steel tube, according to the UHP requirements of the SEMI standard, the components of the film meet: Cr/Fe>1.5, CrOX/FeOX>2; and surface free iron ions are removed to form a chromium-rich layer to improve the corrosion resistance.

The tube is rinsed in the same way as primary cleaning and secondary cleaning to remove the passivation solution on the surface of the tube, the tube is rinsed again through the same rinsing process and method, water on the inner and outer surfaces of the tube drains off, and the interior of the tube is purged to remove water.

After being electrolytically polished, the tube with ultra-high cleanliness is verified according to the test method in Section 6 of *Standard Specification for Passivation of Stainless Steels Using Electropolishing ASTMB*912-2002(2013): pure water is injected into the tube, the pressure is 0.03-0.08 Mpa, online resistivity meters are disposed on two sides of the end of the tube, and when readings of the online resistivity meters on two sides of the end of the tube reach 18*106 Ωcm, the inner surface of the tube meets the ultra-high cleanliness requirement. Otherwise, the tube needs to be re-rinsed.

The stainless steel seamless tube with ultra-high cleanliness should be internally purged and packaged in a dust-free clean workshop, infrastructures in the dust-free clean workshop should be in conformity with the technical specification such as *ISO*14644-1 *Cleanrooms and Associated Controlled Environments*, and the air cleanliness should reach level V or higher level to meet the preparation requirements of stainless steel tubes with ultra-high cleanliness.

The 316L stainless steel seamless tube entering the clean workshop is purged first in a cleanroom to maintain the ultra-high cleanliness of the 316L stainless steel seamless tube.

In the clean workshop, according to the requirements of *SEMI E*49.6 *Guide for Subsystem Assembly and Testing Procedures—Stainless Steel Systems*, the interior of 316L stainless steel seamless tube is purged with 99.999% nitrogen (filtered with a 0.001 μm filter) at 60° C.±5° C. to meet the requirement for ultra-high cleanliness.

Sealing and packaging of the should be in conformity with the requirements of *SEMI E*49.6 *Guide for Subsystem Assembly and Testing Procedures—Stainless Steel Systems* to guarantee the cleanliness of the tube in transportation.

The ends of two sides of the stainless steel tubes should be coated with clean protective films and sleeved with polyethylene protective caps.

Embodiment 1: Molten steel with corresponding components was smelted by means of an EAF, a K-OBM-S converter, VOD+LF, VIM and VAR refining, and was cast into an ingot (raw material of steel tube), and allowable deviations of chemical components of the molten steel are in accordance with the regulations of the GB/T222 standard, as shown in Table 1.

TABLE 1

| Inspection results of chemical components of 316 L stainless steel with ultra-high cleanliness Wt/% | | | | | | | | | | | | | | | |
| Steel tube | | | | | | | | | | | | | | | |
| Chemical components (unit mass %, and the balance Fe and other elements) | | | | | | | | | | | | | | | |
| Elements | C | Mn | P | S | Si | Cr | Ni | Mo | N | Cu | Al | O | H | Nb | Ti | Se |
| Finish tube | 0.008 | 0.05 | 0.010 | 0.002 | 0.19 | 16.735 | 14.667 | 2.324 | 0.010 | 0.150 | 0.008 | 0.0009 | 0.0002 | 0.006 | 0.002 | 0.005 |

Macroscopic examination was performed on a hot-rolled steel bar in terms of GB/T226, and there were no visible defects such as shrinkage cavities, small bubbles, inclusions, white dots and skull patches on an acid-leached macrostructure specimen along the cross-section. According to the GB/T1979 standard, the level of the steel bar is shown in Table 2.

TABLE 2

| Macrostructure (level) | | | |
|---|---|---|---|
| Type | Common looseness | Central looseness | Ingot looseness |
| Level | 0 | 0 | 0 |

Non-metallic inclusions of the 316L stainless steel tube were checked through method A in GB/T10561, and the level and SEMIF20 indicators of the inclusions are shown in Table 3.

TABLE 3

| Level of non-metallic inclusions of the 316 L stainless steel tube | | | | |
|---|---|---|---|---|
| | Measured value | | SEMIF20 Ultrahigh purity indicator | |
| Type | Fine | Coarse | Fine | Coarse |
| A | 0 | 0 | 1.5 | 1.0 |
| B | 0.5 | 0 | 1.0 | 1.0 |

TABLE 3-continued

| Level of non-metallic inclusions of the 316 L stainless steel tube | | | | |
|---|---|---|---|---|
| | Measured value | | SEMIF20 Ultrahigh purity indicator | |
| Type | Fine | Coarse | Fine | Coarse |
| C | 0 | 0 | 1.0 | 1.0 |
| D | 0 | 0 | 1.0 | 1.0 |

According to the method of GB/T13305, the most severe field of view on any detection surface was selected in the vertical direction of the steel tube, and it was detected though a microscope with an amplification factor of 280-320 that the content of ferrite was 0%.

Pierced billets were prepared through hot piercing with 316L stainless steel billets of different specifications as raw materials, 100% surface visual inspection and coping were performed on the pierced billets to remove various defects on the inner and outer surfaces of the pierced billets. The outer diameter and wall thickness of the finished billets are shown in Table 4.

TABLE 4

| Size, tolerance and straightness requirements of pierced billets (mm) | | | | | |
|---|---|---|---|---|---|
| 316L Outer diameter | Outer diameter deviation | Wall thickness | Wall thickness deviation | One-side ΔS | Straightness |
| Diameter 65 mm | ±0.8 mm | 5.0 mm | ±0.7 mm | ≤1.0 mm | ≤1.5 mm |
| Diameter 112 mm | ±1.0 mm | 7.5 mm | ±0.9 mm | ≤1.5 mm | ≤2.0 mm |
| Diameter 132 mm | ±1.5 mm | 9.0 mm | ±1.0 mm | ≤1.5 mm | ≤2.0 mm |

A cold rolling mill was used to control the deformation to manufacture steel tubes mainly based on cold rolling and supplemented by cold drawing; solution heat treatment was performed to control the temperature and time to make steel tubes with the same grain size, according to the requirements of the GB/T6394 standard. The implementation of cold rolling is shown in Table 5.

TABLE 5

| Implementation of cold rolling (mm/level) | | | | | | |
|---|---|---|---|---|---|---|
| Pierced billet | Cold rolling | Cold rolling | Cold rolling | Cold drawing | Specification of finished tube | Grain size |
| Diameter 65 * 5.0 | Diameter 33.4 * 2.5 | Diameter 14 * 1.5 | Diameter 12 * 0.9 | Diameter 9.53 * 0.9 | Diameter 9.53 * 0.89 | Level 6.5 |
| Diameter 65 * 5.0 | Diameter 38 * 2.5 | Diameter 25 * 2.0 | Diameter 14 * 1.24 | Diameter 12.7 * 1.24 | Diameter 12.7 * 1.24 | Level 6.5 |
| Diameter 65 * 5.0 | Diameter 38 * 2.5 | | | | Diameter 19.05 * 1.65 | Level 6.0 |
| Diameter 65 * 5.0 | Diameter 38 * 2.5 | | | | Diameter 25.4 * 1.65 | Level 5.5 |
| Diameter 65 * 5.0 | Diameter 38 * 2.5 | | | Diameter 38.4 * 1.9 | Diameter 38.4 * 1.65 | Level 6.0 |
| Diameter 112 * 7.5 | Diameter 76 * 4.0 | | | | Diameter 50.8 * 2.11 | Level 5.5 |
| Diameter 112 * 7.5 | Diameter 89 * 4.0 | | | | Diameter 60.3 * 2.11 | Level 5.5 |
| Diameter 132 * 9.0 | Diameter 114 * 5.0 | | | | Diameter 76.2 * 2.54 | Level 5.5 |

Intermediate tubes were rolled on an LG60/120-H tube cold-rolling mill; finished tubes were rolled on an LG15/40/110-GHLS two-roller precise tube cold-rolling mill, and a natural gas roller-hearth solution heat treatment furnace was used for intermediate heat treatment, and the temperature was 1100° C.

According to the requirements of the GB/T228.1 standard, specimens were obtained from the head and tail of finished stainless steel seamless tubes to perform an indoor-temperature drawing test, and complete tubes and split specimens were used for drawing; a hardness test was performed according to GB/T4340.1; and specimens were obtained from the head and tail of the finished stainless steel tubes to perform an intercrystalline corrosion test. Test results are shown in Table 6.

TABLE 6

| Mechanics, hardness and intercrystalline corrosion tests (Mpa, %, HV) | | | | | |
|---|---|---|---|---|---|
| Mechanical property | Drawing at room temperature (head/tail) | | | | Intercrystalline corrosion GB4334E method |
| | Rm | $R_{P0.2}$ | A | Hardness | |
| Requirement | ≥485 | ≥175 | ≥35 | HV ≤ 200 | Qualified |
| Diameter 9.53 * 0.89 | 542/537 | 218/225 | 63/64 | 139/140/143 | Qualified |
| Diameter 12.7 * 1.24 | 544/530 | 224/216 | 62/62 | 135/138/141 | Qualified |
| Diameter 19.05 * 1.65 | 531/538 | 210/217 | 61/62 | 136/136/134 | Qualified |
| Diameter 25.4 * 1.65 | 529/536 | 218/222 | 63/62 | 135/134/137 | Qualified |
| Diameter 38.4 * 1.65 | 538/534 | 224/228 | 61/62 | 135/136/138 | Qualified |
| Diameter 50.8 * 2.11 | 527/529 | 237/230 | 60/61 | 137/136/138 | Qualified |
| Diameter 60.3 * 2.11 | 520/518 | 216/221 | 60/62 | 135/136/138 | Qualified |
| Diameter 76.2 * 2.54 | 518/517 | 211/216 | 62/62 | 134/135/135 | Qualified |

According to the requirements of SEMIF19 *"Conditions of Contact Surface of Stainless Steel Elements and Medium"* and SEMIF37 *"Method for Determination of Surface Roughness Parameters for gas distribution system components"*, the tubes were split for visual inspection, inner surfaces of the steel tubes were electrolytically polished, and there was no visible defect. The two ends and three points in the middle of each stainless steel tube of the above specification were detected with a roughmeter, and all values met Ra≤0.2 µm. The surface roughness of all points in the tubes is shown in Table 7.

TABLE 7

| Statistical table of the roughens Ra of the inner surface of the tube (µm) | | | | | | |
|---|---|---|---|---|---|---|
| Measurement points | Front end 1 | Front end 2 | Middle 1 | Middle 1 | Rear end 1 | Rear end 2 |
| Diameter 9.53 * 0.89 | 0.18 | 0.17 | 0.19 | 0.17 | 0.17 | 0.18 |
| Diameter 12.7 * 1.24 | 0.18 | 0.17 | 0.17 | 0.18 | 0.18 | 0.18 |
| Diameter 19.05 * 1.65 | 0.17 | 0.17 | 0.18 | 0.16 | 0.17 | 0.18 |
| Diameter 25.4 * 1.65 | 0.15 | 0.17 | 0.16 | 0.17 | 0.17 | 0.15 |
| Diameter 38.4 * 1.65 | 0.15 | 0.15 | 0.16 | 0.16 | 0.15 | 0.16 |
| Diameter 50.8 * 2.11 | 0.14 | 0.13 | 0.13 | 0.13 | 0.14 | 0.15 |
| Diameter 60.3 * 2.11 | 0.15 | 0.13 | 0.13 | 0.15 | 0.14 | 0.15 |
| Diameter 76.2 * 2.54 | 0.13 | 0.15 | 0.15 | 0.14 | 0.13 | 0.13 |

The oxide thickness and surface XPS of the inner surfaces of the tubes were detected and analyzed with AES-XPS according to the international standard test method for the semiconductor industry. The results are shown in Table 8:

| Requirement | Cr/Fe | Crox/Feox |
|---|---|---|
| Diameter 9.53 * 0.89 | 1.8 | 2.7 |
| Diameter 12.7 * 1.24 | 1.9 | 2.9 |
| Diameter 19.05 * 1.65 | 1.8 | 2.8 |
| Diameter 25.4 * 1.65 | 1.9 | 2.7 |
| Diameter 38.4 * 1.65 | 1.9 | 2.8 |
| Diameter 50.8 * 2.11 | 1.8 | 2.9 |
| Diameter 60.3 * 2.11 | 1.9 | 2.9 |
| Diameter 76.2 * 2.54 | 2.0 | 2.9 |

Embodiment 2: the difference of this embodiment from Embodiment 1 is the influence of deformation of cold-rolled tubes on the grain size and intercrystalline corrosion; an electric heater was used for heating, and the temperature of an acid liquor was controlled to 55° C., the polishing voltage was lower than or equal to 30V, the current density was 50 A/dm2, and the electrolytic polishing time was 10 min. The passivation solution was a $HNO_3$ solution with a mass percent of 35%, and the passivation time was 30 min.

A stainless steel seamless tube with ultra-high cleanliness for a semiconductor preparation device comprised, by mass, 0.009% C, 0.011% P, 0.003% S, 0.06% Mn, 0.20% Si, 0.007% Al, 0.014% Cu, 16.804% Cr, 14.711Ni, 2.326% Mo, 0.008% N, 0.006% Nb, 0.003% Ti, 0.005% Se, and the balance Fe and impurities.

Non-metallic inclusions of the 316L stainless steel tube were checked through method Ain GB/T10561: A, fine, level 0; A, course, level 0; B, fine, level 0; B, coarse, level 0; C, fine, level 0; C, coarse, level 0; D, fine, level 0; D, coarse, level 0: and the level of the inclusions met the requirements of SEMI F20 (see Table 3).

Pierced billets with a diameter of 65 mm, a diameter of 112 mm and a diameter of 132 mm were rolled on an LG60-H tube cold-rolling mill and an LG120-H tube cold-rolling mill respectively; and in the finish pass, the billets were rolled and partially drawn on LG15-HDDG, LG30-HDDG and LG60-HDDG two-roller precise tube cold-rolling mills to obtain finished tubes. Intermediate tubes were treated through a natural gas roller-hearth solution heat treatment furnace, and the temperature was 1100° C. The feeding speed was controlled to 0.6-2.0 m/min according to the actual outer diameter and wall thickness and can be adjusted. The process is shown in Table 9.

TABLE 9

Table of the rolling process (mm/level)

| Pierced billets | Cold rolling | Cold rolling | Cold drawing | Specification of finished tube | Grain size | Intercrystalline corrosion |
|---|---|---|---|---|---|---|
| Diameter 65 * 5.0 | Diameter 33.4 * 2.0 | Diameter 14 * 1.0 | Diameter 9.53 * 0.9 | Diameter 9.53 * 0.89 | Level 8.0 | Unqualified |
| Diameter 65 * 5.0 | Diameter 33.4 * 2.2 | Diameter 16 * 1.3 | Diameter 12.7 * 1.24 | Diameter 12.7 * 1.24 | Level 7.5 | Unqualified |
| Diameter 65 * 5.0 | Diameter 38 * 2.5 | | | Diameter 19.05 * 1.65 | Level 6.5 | Qualified |
| Diametetr 65 * 5.0 | Diameter 38 * 2.5 | | | Diameter 25.4 * 1.65 | Level 6.0 | Qualified |
| Diameter 65 * 5.0 | Diameter 38 * 2.5 | | Diameter 38.4 * 1.9 | Diameter 38.4 * 1.65 | Level 6.0 | Qualified |
| Diameter 112 * 7.5 | Diameter 76 * 4.0 | | | Diameter 50.8 * 2.11 | Level 6 | Qualified |
| Diameter 112 * 7.5 | Diameter 89 * 4.0 | | | Diameter 60.3 * 2.11 | Level 5.5 | Qualified |
| Diameter 132 * 9.0 | Diameter 114 * 5.0 | | | Diameter 76.2 * 2.54 | Level 5.5 | Qualified |

According to the requirements of the GB/T228.1 standard, specimens were obtained from the head and tail of finished stainless steel seamless tubes to perform an indoor-temperature drawing test, and complete tubes and split specimens were used for drawing; a hardness test was performed according to GB/T4340.1. Test results are shown in Table 10.

TABLE 10

Mechanics, hardness and intercrystalline corrosion tests (Mpa, %, HV)

| Mechanical property | Drawing at room temperature (head/tail) | | | Hardness |
|---|---|---|---|---|
| | Rm | $R_{P0.2}$ | A | |
| Requirement | ≥485 | ≥175 | ≥35 | HV ≤ 200 |
| Diameter 9.53 * 0.89 | 572/569 | 248/253 | 60/59 | 154/148/153 |
| Diameter 12.7 * 1.24 | 567/559 | 245/242 | 58/59 | 145/144/148 |
| Diameter 19.05 * 1.65 | 538/540 | 230/235 | 60/61 | 140/142/143 |
| Diameter 25.4 * 1.65 | 536/530 | 228/233 | 60/62 | 144/141/138 |
| Diameter 38.4 * 1.65 | 537/535 | 232/230 | 61/61 | 138/140/142 |
| Diameter 50.8 * 2.11 | 530/525 | 227/235 | 60/60 | 138/135/138 |
| Diameter 60.3 * 2.11 | 524/531 | 232/218 | 62/61 | 135/135/137 |
| Diameter 76.2 * 2.54 | 528/515 | 226/209 | 62/64 | 134/135/138 |

According to the method of GB/T13305, the most severe field of view on any detection surface was selected in the vertical direction of the steel tube, and it was detected through a microscope with an amplification factor of 280-320 that the content of ferrite was 0.11%.

According to the requirements of SEMIF19 *"Conditions of Contact Surface of Stainless Steel Elements and Medium"* and SEMIF37 *"Method for Determination of Surface Roughness Parameters for gas distribution system components"*, the tube was split for visual inspection, the inner surface of the steel tube was electrolytically polished, and there was no visible defect. The two ends and three points in the middle of each stainless steel tube of the above specification were detected with a roughmeter, and all values met Ra≤0.2 μm. The surface roughness of all points in the tubes is shown in Table 11.

TABLE 11

Statistical table of the roughens Ra of the inner surface of the tube (μm)

| Measurement points | Front end 1 | Front end 2 | Middle 1 | Middle 1 | Rear end 1 | Rear end 2 |
|---|---|---|---|---|---|---|
| Diameter 9.53 * 0.89 | 0.16 | 0.17 | 0.16 | 0.17 | 0.16 | 0.18 |
| Diameter 12.7 * 1.24 | 0.16 | 0.16 | 0.15 | 0.15 | 0.16 | 0.16 |
| Diameter 19.05 * 1.65 | 0.15 | 0.16 | 0.16 | 0.16 | 0.17 | 0.15 |
| Diameter 25.4 * 1.65 | 0.15 | 0.17 | 0.16 | 0.17 | 0.17 | 0.15 |
| Diameter 38.4 * 1.65 | 0.15 | 0.15 | 0.16 | 0.16 | 0.15 | 0.16 |
| Diameter 50.8 * 2.11 | 0.14 | 0.13 | 0.13 | 0.13 | 0.14 | 0.15 |
| Diameter 60.3 * 2.11 | 0.15 | 0.13 | 0.13 | 0.15 | 0.14 | 0.15 |
| Diameter 76.2 * 2.54 | 0.13 | 0.15 | 0.15 | 0.14 | 0.13 | 0.13 |

The oxide thickness and surface XPS of the inner surfaces of the tubes were detected and analyzed with AES-XPS according to the international standard test method for the semiconductor industry. The results are shown in Table 12.

TABLE 12

| Requirements | Cr/Fe | Crox/Feox |
|---|---|---|
| Diameter 9.53 * 0.89 | 2.2 | 3.1 |
| Diameter 12.7 * 1.24 | 2.3 | 3.2 |
| Diameter 19.05 * 1.65 | 2.2 | 3.2 |
| Diameter 25.4 * 1.65 | 2.3 | 3.1 |
| Diameter 38.4 * 1.65 | 2.3 | 3.2 |
| Diameter 50.8 * 2.11 | 2.4 | 3.1 |
| Diameter 60.3 * 2.11 | 2.3 | 3.2 |

TABLE 12-continued

| Requirements | Cr/Fe | Crox/Feox |
|---|---|---|
| Diametrer 76.2 * 2.54 | 2.4 | 3.3 |

Embodiment 3: the difference of this embodiment is the addition of niobium and titanium to steel and the influence of deformation of cold-rolled tubes on the grain size and intercrystalline corrosion; an electric heater was used for heating, and the temperature of an acid liquor was controlled to 43° C., the polishing voltage was lower than or equal to 30V, the current density was 50 A/dm2, and the electrolytic polishing time was 15 min. The passivation solution was a $HNO_3$ solution with a mass percent of 20%, and the passivation time was 10 min.

A stainless steel seamless tube with ultra-high cleanliness for a semiconductor preparation device comprised, by mass, 0.008% C, 0.010% P, 0.002% S, 0.06% Mn, 0.20% Si, 0.007% Al, 0.015% Cu, 16.791% Cr, 14.658Ni, 2.322% Mo, 0.009% N, 0.007% Nb, 0.002% Ti, 0.006% Se, and the balance Fe and impurities.

Non-metallic inclusions of the 316L stainless steel tube were checked through method A in GB/T10561, and the level of the inclusions met the requirements of SEMI F20: A, fine, level 0; A, course, level 0; B, fine, level 0; B, coarse, level 0; C, fine, level 0; C, coarse, level 0; D, fine, level 0; D, coarse, level 0.

Pierced billets with a diameter of 65 mm, a diameter of 112 mm and a diameter of 132 mm were rolled on an LG60-H tube cold-rolling mill and an LG120-H tube cold-rolling mill respectively; and in the finish pass, the billets were rolled and partially drawn on LG15-HDDG, LG30-HDDG and LG60-HDDG two-roller precise tube cold-rolling mills to obtain finished tubes. Intermediate tubes were treated through a natural gas roller-hearth solution heat treatment furnace, and the temperature was 1140° C. The feeding speed was controlled to 0.6-2.0 m/min according to the actual outer diameter and wall thickness and can be adjusted. The process is shown in Table 13.

TABLE 13

Table of the rolling process (mm/level)

| Pierced billet | Cold rolling | Cold rolling | Cold drawing | Specification of finished tube | Grain size | Intercrystalline corrosion |
|---|---|---|---|---|---|---|
| Diameter 65 * 5.0 | Diameter 33.4 * 2.5 | Diameter 14 * 1.5 | Diameter 12 * 0.9 | Diameter 9.53 * 0.9 | Level 6.5 | Qualified |
| Diameter 65 * 5.0 | Diameter 38 * 2.5 | Diameter 25 * 2.0 | Diameter 14 * 1.24 | Diameter 12.7 * 1.24 | Level 6.0 | Qualified |
| Diameter 65 * 5.0 | Diameter 38 * 2.5 | | | | Level 6.0 | Qualified |
| Diameter 65 * 5.0 | Diameter 38 * 2.5 | | | | Level 5.5 | Qualified |
| Diameter 65 * 5.0 | Diameter 38 * 2.5 | | | Diameter 38.4 * 1.9 | Level 5.5 | Qualified |
| Diameter 112 * 7.5 | Diameter 76 * 4.0 | | | | Level 5.0 | Qualified |
| diameter 112 * 7.5 | diameter 89 * 4.0 | | | | Level 5.5 | Qualified |
| Diameter 132 * 9.0 | Diameter 114 * 5.0 | | | | Level 5.0 | Qualified |

According to the requirements of the GB/T228.1 standard, specimens were obtained from the head and tail of finished stainless steel seamless tubes to perform an indoor-temperature drawing test, and complete tubes and split specimens were used for drawing; a hardness test was performed according to GB/T4340.1. All test results meet standard requirements.

The test results are shown in Table 14.

TABLE 14

Mechanics, hardness and intercrystalline corrosion tests (Mpa, %, HV)

| Mechanical property | Drawing at room temperature (head/tail) | | | Hardness |
|---|---|---|---|---|
| | Rm | $R_{P0.2}$ | A | |
| Requirement | ≥485 | ≥175 | ≥35 | HV ≤ 200 |
| Diameter 9.53 * 0.89 | 522/525 | 211/203 | 64/63 | 132/130/132 |
| Diameter 12.7 * 1.24 | 534/532 | 225/215 | 63/64 | 133/132/135 |
| Diameter 19.05 * 1.65 | 521/530 | 220/212 | 63/62 | 134/133/132 |
| Diameter 25.4 * 1.65 | 526/530 | 215/221 | 63/60 | 135/132/134 |
| Diameter 38.4 * 1.65 | 533/528 | 214/229 | 62/62 | 134/132/138 |
| Diameter 50.8 * 2.11 | 526/529 | 230/214 | 60/64 | 133/135/132 |
| Diameter 60.3 * 2.11 | 527/526 | 226/225 | 60/64 | 132/134/135 |
| Diameter 76.2 * 2.54 | 519/516 | 225/217 | 62/63 | 134/135/134 |

According to the method of GB/T13305, the most severe field of view on any detection surface was selected in the vertical direction of the steel tube, and it was detected though a microscope with an amplification factor of 280-320 that the content of ferrite was 0%.

According to the requirements of SEMIF19 *"Conditions of Contact Surface of Stainless Steel Elements and Medium"* and SEMIF37 *"Method for Determination of Surface Roughness Parameters for gas distribution system components"*, the tube was split for visual inspection, the inner surface of the steel tube was electrolytically polished, and there was no visible defect. The two ends and three points in the middle of each stainless steel tube of the above specification were detected with a roughmeter. The surface roughness of all points in the tubes is shown in Table 15.

TABLE 15

| | Statistical table of the roughens Ra of the inner surface of the tube (µm) | | | | | |
|---|---|---|---|---|---|---|
| Measurement points | Front end 1 | Front end 2 | Middle 1 | Middle 1 | Rear end 1 | Rear end 2 |
| Diameter 9.53 * 0.89 | 0.19 | 0.20 | 0.19 | 0.20 | 0.20 | 0.20 |
| Diameter 12.7 * 1.24 | 0.19 | 0.19 | 0.19 | 0.18 | 0.20 | 0.19 |
| Diameter 19.05 * 1.65 | 0.19 | 0.19 | 0.18 | 0.19 | 0.19 | 0.19 |
| Diameter 25.4 * 1.65 | 0.18 | 0.17 | 0.19 | 0.20 | 0.19 | 0.19 |
| Diameter 38.4 * 1.65 | 0.19 | 0.17 | 0.19 | 0.19 | 0.19 | 0.18 |
| Diameter 50.8 * 2.11 | 0.18 | 0.17 | 0.19 | 0.18 | 0.19 | 0.20 |
| Diameter 60.3 * 2.11 | 0.18 | 0.18 | 0.18 | 0.19 | 0.18 | 0.18 |
| Diameter 76.2 * 2.54 | 0.17 | 0.18 | 0.17 | 0.18 | 0.17 | 0.18 |

The oxide thickness and surface XPS of the inner surfaces of the tubes were detected and analyzed with AES-XPS according to the international standard test method for the semiconductor industry. The results are shown in Table 16.

TABLE 16

| Requirement | Cr/Fe | Crox/Feox |
|---|---|---|
| Diameter 9.53 * 0.89 | 1.5 | 2.0 |
| Diameter 12.7 * 1.24 | 1.5 | 2.0 |
| Diameter 19.05 * 1.65 | 1.5 | 2.1 |
| Diameter 25.4 * 1.65 | 1.6 | 2.0 |
| Diameter 38.4 * 1.65 | 1.6 | 2.0 |
| Diameter 50.8 * 2.11 | 1.5 | 2.1 |
| Diameter 60.3 * 2.11 | 1.5 | 2.1 |
| Diameter 76.2 * 2.54 | 1.6 | 2.1 |

Non-destructive inspection results are as follows: an ultrasonic test is tested on inner and outer surfaces of specimens in the vertical direction and the horizontal direction according to NB/T20003 through an SST-40 wireless transmission rotary ultrasonic and eddy integrated joint detection device and a pulse reflecting ultrasonic test system, and a rectangular groove of standard specimens has a depth of 0.1-1.0 mm, a width not over 1.6 mm and a length not over 12.5 mm. The qualification rate of ultrasonic flaw detection is over 95%. A eddy current flaw detection test is performed on specimens with a nominal outer diameter less than 65 mm in the vertical direction and the circumferential direction according to the NB/T20003 standard through a digital eddy current flaw detection system, the diameter of a through hole of standard specimens is not over 1.5 mm, and a groove of the standard specimens has a depth not over 0.1 mm, a width not over 1.5 mm and a length not over 25 mm. According to the ASTME165, a penetration test is performed on at least 50 mm of the end of all tubes, and the test length of the inner surface of the tubes should be as long as possible according to the inner diameter. A hydrostatic test is performed on all finished stainless steel seamless tubes according to the ASTMA999 standard, the test pressure is calculated by P=2SR/D, and the qualification rate of the hydrostatic test is over 100%.

The invention and implementations thereof are illustratively described above. However, this description is not restrictive, those illustrated in the drawings are merely possible implementations of the invention, and the actual structures are not limited to those illustrated in the drawings. So, all structures and embodiments similar to the technical solutions in this specification designed by those ordinarily skilled in the art without departing from the inventive concept of the invention under the enlightenment of this specification should also fall within the protection scope of the invention.

What is claimed is:

1. A method for preparing a stainless steel seamless tube for an integrated circuit and an IC industry preparation device, comprising the following steps:

a: a stainless steel refining process: with 316L stainless steel as a base material, adding alloys into an Electric Arc Furnace (EAF) for primary smelting and hot metal pretreatment including S removal, Si removal and P removal to reduce the content of S, Si, P and C in hot metal to prepare stainless steel pre-melt; performing oxygen pre-blowing and boiling decarburization on the stainless steel pre-melt in a K-OBM-converter to make the content of C in a slag system less than or equal to 0.9 mass %; next, performing Vacuum Oxygen Decarburization (VOD) refining to make the content of Al less than or equal to 0.03 mass % and the content of oxygen less than or equal to 0.0030 mass %; then, performing Ladle Furnace (LF) refining to control the content of Al in the steel to 0.012%-0.018 mass %, the content of oxygen in the steel to 0.0011%-0.0020 mass % and the content of H in the steel to 0.0005 mass %-0.0010 mass %, to make non-metallic inclusions in molten steel refined and distributed dispersively;

b: a vacuum induction melting and vacuum consumable remelting process: removing C, O, and H in the molten steel through vacuum induction melting to reduce the solubility of O and H in the molten steel, removing compounds formed by Mo, Ca, C, Al, P, S, Si, and As in the molten steel by floating with slag, and then performing casting to obtain a steel ingot; using the steel ingot as an electrode for vacuum consumable remelting, further purifying the molten steel in the process of melting the electrode to form liquid drops, and washing and solidifying the slag, to make the content of ferrite less than or equal to 0.5 volume %, the content of H less than or equal to 0.0002 mass % and the content of O less than or equal to 0.0015 mass %;

c: a stainless steel forging process: preparing round billets through steel ingot forging and continuous steel bar rolling;

d: a hot piercing process: performing hot piercing on the round billets to produce pierced billets;

e: a cold working process: performing intermediate cold working and finish-rolling cold working to obtain a plurality of stainless steel seamless tubes;

f: an inner bore electrolytic polishing, pickling and passivation process: hanging the stainless steel seamless tubes prepared in Step e on a customized fixture, using a stainless steel tube in an electrolytic cell as an electrolytic anode, performing heating through an electrical heating rod, controlling the temperature of acid liquor to 43° C.-70° C., a DC multi-pulse voltage to be lower than or equal to 30V and a current density to 5-50 A/dm, and stirring a resulting electrolytic polishing solution for convection to decrease a temperature difference of an electrolyte to prevent the anode from being overheated, wherein the electrolytic polishing time is 5-15 min; after polishing is finished, performing pickling and passivation, and removing free iron ions on a surface of each stainless steel seamless tube to form a chromium-rich layer on the surface to improve corrosion resistance; and g: a cleaning process: degreasing and cleaning the plurality of stainless steel seamless tube prepared in Step f, wherein vibration cleaning is performed on the stainless steel seamless tubes first with ultrasonic waves and a cleaning agent, inner bores of the stainless steel seamless tubes are washed one by one by means of a circulating water spray lance after the stainless steel seamless tubes are cleaned, outer surfaces of the stainless steel seamless tubes are sprayed to be rinsed, water from the circulating water spray lance is controlled at a temperature of 60° C.±5° C., water on the surfaces of the stainless steel seamless tubes drains off, and inner walls of the tubes are purged one by one to remove water; then, the stainless steel seamless tubes are cleaned by means of an ultrasonic cleaning machine using pure water as cleaning water, the inner bores of the tubes are washed with water for 1-5 min, the outer surfaces of the tubes are rinsed for 3-5 min, then water on the outer surfaces drains off, the interior of each tube is purged with compressed air to remove water, and finally, stainless steel seamless tubes are obtained.

2. The method for preparing a stainless steel seamless tube for an integrated circuit and an IC industry preparation device according to claim 1, wherein the electrolytic polishing solution in Step f is prepared from $H_2SO_4$ with a concentration of 98 mass %, $H_3PO_4$ with a concentration of 85 mass %, and ionized water, and comprises 15%-20 mass % of $H_2SO_4$, 63 mass %-67 mass % of $H_3PO_4$, 12 mass %-22 mass % of $H_2O$, and an additive, and the proportion of the electrolytic polishing solution is adjusted to 1.5-1.7; and a passivation solution is a $HNO_3$ solution with a mass percent of 20%-35%, and the 316 stainless steel tubes are passivated in a passivation cell for 10-30 min.

3. The method for preparing a stainless steel seamless tube for an integrated circuit and an IC industry preparation device according to claim 1, wherein through hot metal pretreatment including S removal, Si removal and P removal in Step a, impurity element are removed during smelting, such that the content of S is decreased to 0.05 mass %-0.06 mass %, the content of Si is decreased to 0.3 mass %-1.0 mass %, the content of P is decreased to 0.14 mass %-0.3 mass %, and the content of C in the molten steel is 4%-6%.

4. The method for preparing a stainless steel seamless tube for an integrated circuit and an IC industry preparation device according to claim 3, wherein in Step a, the K-OBM-S converter adopts stirring based on top oxygen blowing and bottom oxygen and nitrogen or argon blowing for decarburization to increase the decarburization rate and reduce the loss of Cr; by controlling bottom-blowing stirring for oxygen pre-blowing and boiling decarburization, the inclusions are controlled within a melting point range; and Ni alloy is added, so the temperature is maintained at 1680-1750° C., and the decarburization rate is 0.15-0.3%/min; and the content of C in the steel is controlled to reduce the decarburization pressure during VOD smelting, so the hazardous elements P and S are removed, and the cleanliness of the molten steel is improved.

5. The method for preparing a stainless steel seamless tube for an integrated circuit and an IC industry preparation device according to claim 4, wherein in Step a, a VOD furnace adopts argon-blowing stirring, Al shots are used as a deoxidant; after Al deoxidation, CaO and MgO are added, the alkalinity is controlled, and bottom-blowing stirring is performed to make an deoxidized product exist in the molten steel in the form of an $Al_2O_3$ inclusion, refining slag which comprises 40%-60% of CaO, 10%-20% of $SiO_2$, 6%-12% of MgO and 15%-25% of $Al_2O_3$ and has an alkalinity of 2.0-3.5 is added; inclusions are absorbed by the slag and float with the slag to be removed, such that the inclusions in the steel are changed from composite inclusions into pure magnesium aluminate spinel inclusions; and the content of P, S, Si and Al in the stainless steel is further decreased, and the content of O and H is further decreased through VOD refining.

6. The method for preparing a stainless steel seamless tube with for an integrated circuit and an IC industry preparation device according to claim 5, wherein during LF refining in Step a, a slag system comprising MgO $Al_2O_3$ is formed to further remove O and H in the steel; then, argon stirring is performed to remove 10 μm or even smaller inclusions through bubbles, and the inclusions collide one another and are gathered to form large-grained inclusions more rapidly, so the inclusions float rapidly to be removed; and through deoxidation with Al powder, slag system optimization, calcium treatment and stirring, the content of Al in the steel is controlled to 0.012 mass %-0.018 mass %, thus ensuring that the content of oxygen is less than or equal to 0.0015 mass % and the content of H is 0.0002 mass %-0.0005 mass %.

7. The method for preparing a stainless steel seamless tube for an integrated circuit and an IC industry preparation device according to claim 1, wherein during vacuum induction melting in Step b, the temperature of the molten steel is controlled to 1620° C.-1670° C., and melting is performed for 15-21 min under a vacuum condition of 4-10 pa, argon-blowing stirring is performed to effectively reduce C—O partial pressure and reduce a product of carbon content and oxygen content; C, O, H and impurities in the molten steel are removed from a surface of the molten steel, and then, metallic components of the molten steel are adjusted to ensure that impurities in the 316L stainless steel are minimized; the molten steel is condensed in the furnace; when power is cut off to cool the molten stainless steel to 1450° C.-1490° C., the molten steel is condensed to reduce the solubility of O and H in the molten steel, such that dissolved gas appears on the surface of the molten steel and is released from the molten steel; power supply resumes for vacuum induction melting, the temperature is increased to be slightly higher than the melting point 1545±10° C. of the stainless steel, and $SiO_2$ and desulfurizing agents CaO and MgO are added to the steel under the condition of argon-blowing stirring to form a slag system, which comprises, by mass, 45% of CaO, 18% of $SiO_2$, 6% of MgO and 30% of $Al_2O_3$ and has an alkalinity of 2.0-3.0; when $SiO_2$, CaO and MgO are added, stirring is performed to enable the inclusions to be further adsorbed by the slag to be removed; vacuumizing is performed for 5±1 min until the vacuum degree is less than 5 pa, and different compounds formed by Mo, Ca, C, Al, P, S, Si, As in the molten steel are adsorbed by the slag and float with the slag to be removed; during vacuum consumable remelting, refining slag which comprises 17% of CaO, 22% of SiO, 3% of MgO and 15% of $Al_2O_3$ and has an alkalinity of 1.0-1.5 is used, Al powder added during slagging consumes oxides in liquid slag, and inclusions are removed through slag washing and floating in a molten bath; when the remaining weight of the consumable electrode is 20%, final hot-topping is performed, the current is gradually reduced to 1.4-1.8 kA, an electric arc is maintained and smelting feeding is performed continuously, the voltage is controlled to 22.0-25.0V, a melting rate of the consumable electrode is controlled to 1.0-1.5 kg/min, water inlet and outlet temperatures of a crucible are controlled to 30-32° C.; and the cast ingot is discharged after being continuously cooled to be less than or equal to 400° C. in a vacuum condition.

8. The method for preparing a stainless steel seamless tube for an integrated circuit and an IC industry preparation device according to claim 1, wherein technical parameters of the hot piercing process based on temperature-rotational speed matching of the stainless steel pierced billet in Step d meet the following conditions: when a diameter of the pierced billet is less than or equal to 65 mm, an outlet temperature of a heating furnace is controlled to 1160° C.-1200° C., a heating time is controlled to 140 min-160 min, and a holding time is controlled to 15 min-28 min; when the diameter of the billet is 75 mm-135 mm, the outlet temperature of the heating furnace is controlled to 1170°

C.-1220° C., the heating time is controlled to 170 min-290 min, and the holding time is controlled to 23 min-64 min; through immersive cooling of the billet after piercing, a ferritic phase in a solid state is re-dissolved into a solid solution, and the content of ferrite in a thickness direction of a tube wall is further decreased gradiently, such that the content of remaining ferrite in the billet is less than or equal to 0.5%.

9. The method for preparing a stainless steel seamless tube for an integrated circuit and an IC industry preparation device according to claim 1, wherein when a two-roller tube cold-rolling mill is used for rolling in Step e, grains are drawn to be fibrous in a deformation direction according to a coefficient of elongation of rolling deformation, which is 1.5-2.3, corresponding to a grain size of the pierced billet, a coefficient of elongation of deformation of the cold-rolled tube is 1.5-2.3, a diameter reduction is controlled to 32%-50%, and a wall reduction is controlled to 30%-55%.

* * * * *